(12) United States Patent
Seegmiller et al.

(10) Patent No.: US 12,065,132 B2
(45) Date of Patent: Aug. 20, 2024

(54) METHODS AND SYSTEMS FOR INFERRING UNPAINTED STOP LINES FOR AUTONOMOUS VEHICLES

(71) Applicant: Argo AI, LLC, Pittsburgh, PA (US)

(72) Inventors: Neal Seegmiller, Pittsburgh, PA (US); Xi Cai, San Jose, CA (US)

(73) Assignee: Argo AI, LLC, Pittsburgh, PA (US)

( * ) Notice: Subject to any disclaimer, the term of this patent is extended or adjusted under 35 U.S.C. 154(b) by 130 days.

(21) Appl. No.: 17/234,889

(22) Filed: Apr. 20, 2021

(65) Prior Publication Data

US 2022/0332310 A1 Oct. 20, 2022

(51) Int. Cl.
*B60W 30/085* (2012.01)
*B60W 30/18* (2012.01)
*G06V 20/56* (2022.01)
*G08G 1/082* (2006.01)

(52) U.S. Cl.
CPC .... *B60W 30/085* (2013.01); *B60W 30/18109* (2013.01); *G06V 20/588* (2022.01); *G08G 1/082* (2013.01); *B60W 2552/53* (2020.02)

(58) Field of Classification Search
CPC ......... B60W 30/085; B60W 30/18109; B60W 2552/53; G06V 20/588; G08G 1/082
USPC .......................................................... 701/70
See application file for complete search history.

(56) References Cited

U.S. PATENT DOCUMENTS

| | | | | |
|---|---|---|---|---|
| 2019/0286147 A1* | 9/2019 | Matsunaga | ....... | B60W 60/0015 |
| 2019/0318620 A1* | 10/2019 | Yang | ................... | G08G 1/0133 |
| 2020/0209873 A1* | 7/2020 | Chen | .................. | G01C 21/3822 |
| 2021/0064894 A1* | 3/2021 | Ikezawa | ................ | G08G 1/166 |
| 2022/0155097 A1* | 5/2022 | Tsukamoto | ........ | G01C 21/3822 |

FOREIGN PATENT DOCUMENTS

EP 3759643 A1 1/2021
JP 2017053678 * 3/2017

OTHER PUBLICATIONS

Wang, Intersection and Stop Bar Position Extraction From Vehicle Positioning Data, Dec. 15, 2020, IEEE Transactions on Intelligent Transportation Systems, vol. 23 No. 4 (Year: 2020).*
PCT/ISA/210 and PCT/ISA/237, International Search Report and Written Opinion for PCT/US22/71765 dated Aug. 14, 2022, 8 pages.

(Continued)

*Primary Examiner* — Peter D Nolan
*Assistant Examiner* — Matthias S Weisfeld
(74) *Attorney, Agent, or Firm* — Fox Rothschild LLP

(57) ABSTRACT

A system and method for inferring a stop line for a vehicle at an intersection are provided. The system includes a processor configured to detect from accessed map data that a traffic control measure is positioned before an intersection and determine whether a stop line for the detected traffic control measure is painted. The processor, in response to determining that no stop line is painted, identifies a restricted lane and infers a stop line. The processor infers the stop line by identifying, as a nearest lane conflict, a lane segment of a second road intersecting the first road at the intersection and advancing a location of the entry line as an intermediate stop line a distance toward the nearest lane conflict, until the intermediate stop line is at a target distance from a nearest boundary of the nearest lane conflict to form an inferred stop line.

21 Claims, 15 Drawing Sheets

(56) References Cited

OTHER PUBLICATIONS

Gehrig, S. et al., "System Architecture for an Intersection Assistant Fusing Image, Map, and GPS Information".

Marita, T. et al., "Stop-Line Detection and Localization Method for Intersection Scenarios," https://researchgate.net/publication/252053709, Aug. 2011, pp. 293-298.

Ruhhammer, C. et al., "Automated Intersection Mapping from Crowd Trajectory Data," IEEE Transactions on Intelligent Transportation Systems, vol. 18, No. 3, Mar. 2017.

* cited by examiner

METHODS AND SYSTEMS FOR INFERRING UNPAINTED STOP LINES FOR AUTONOMOUS VEHICLES

BACKGROUND

An autonomous vehicle relies on signage, markings painted on the roadways or signposts on the side of the roadways to help it navigate through an environment. For example, an autonomous vehicle approaches a stop sign or other traffic control measure, the vehicle may rely on painted marks, such as a stop line or a crosswalk, to determine where to stop for the safety of pedestrians, other vehicles and itself. In some instances, the painted markings are either absent or undetectable by the vehicle's vision system. This can cause the vehicle to stop at an unnatural location relative to the intersection, which can promote various challenges to the vehicle's ability to advance through an intersection.

Stopping at an unnatural location farther back from an intersection can cause other drivers to proceed out of turn when advancing through an intersection with traffic control measures. This challenge becomes exacerbated at intersections with four-way stop signs, for example. Additionally, when an autonomous vehicle stops farther back from an intersection, the vehicle is more likely to encounter obstructions, such as buildings, which block the vehicle's line-of-sight to portions of an intersecting road. Moreover, other vehicles or road users on intersecting roads may have their views occluded as well. Accordingly, better methods of helping an autonomous vehicle determine where to stop are needed.

This document describes methods and systems that are directed to addressing the problems described above, and/or other issues.

SUMMARY

In various embodiments, a system for inferring a stop line for a vehicle at an intersection is provided. The system may include sensors configured to capture data about an environment that is proximate the vehicle and a processor. The system may include a non-transitory computer readable medium including programming instructions that, when executed by the processor, will cause the processor to, while the vehicle is moving along a reference path on a first road in a geographic area, access map data comprising data representing a plurality of roads in the geographic area. The map data segments each of the roads into lane segments. While the vehicle is moving along in the geographic area, the processor detects from the accessed map data that a traffic control measure is positioned before an intersection that is ahead of the vehicle in the reference path, and determines whether a stop line for the detected traffic control measure is painted on the first road before or at the intersection. Also, the processor, in response to determining that no stop line is painted, identifies, as a restricted lane, a lane segment of the first road that (i) includes an entry line proximate a location of the traffic control measure and (ii) extends into the intersection, and infers a stop line. The processor may infer the stop line by identifying, as a nearest lane conflict, a lane segment of a second road intersecting the first road at the intersection; and advancing a location of the entry line as an intermediate stop line a distance toward the nearest lane conflict until the intermediate stop line is at a target distance from a nearest boundary of the nearest lane conflict to form an inferred stop line.

In some embodiments, the system may further include programming instructions that will cause the processor to cause the vehicle to decelerate and stop at a location in the restricted lane at or before the inferred stop line.

In some embodiments, the programming instructions that will cause the processor to infer the stop line may further includes programming instructions to construct a line segment as the intermediate stop line between a first set of points alongside boundaries of the restricted lane; and iteratively advance opposite endpoints of the line segment along the side boundaries until the endpoints are equidistant from the target distance from the nearest boundary of the nearest lane conflict, thus yielding the inferred stop line.

In some embodiments, the programming instructions may further include programming instructions that will cause the processor to when iteratively advancing the opposite endpoints of the line segment, advance the opposite endpoints independently until each of the opposite endpoints reaches the target distance from the nearest boundary of the nearest lane conflict; and forming the inferred stop line to intersect the restricted lane at the same angle as the nearest lane conflict.

In some embodiments, the system may further include programming instructions that will cause the processor to detect that a crosswalk crosses the first road before the nearest lane conflict of the intersection. The programming instructions that will cause the processor to infer the stop line may further include programming instructions that will cause the processor to construct a line segment as the intermediate stop line across the restricted lane; and advance the line segment to a location that is equidistant from and at a target distance from a nearest boundary of the crosswalk.

In some embodiments, the programming instructions that will cause the processor to infer the stop line may further include programming instructions that will cause the processor to construct an intermediate stop line between a first set of points alongside boundaries of the restricted lane; and iteratively advance opposite endpoints of the intermediate stop line along the side boundaries until the endpoints are each equidistant from and at the target distance from the nearest boundary of the crosswalk, thus yielding the inferred stop line.

In some embodiments, the system may further include programming instructions that will cause the processor to, in response to determining that no nearest lane conflict is identified as appropriate to infer a stop line, setting the entry line as the stop line; and causing the vehicle to stop at the entry line of the restricted lane.

In some embodiments, the system may further include programming instructions that will cause the processor to determining whether a line-of-sight of a vision system of the vehicle remains blocked to an intersecting road of the intersection; and refining the target distance, in response to the line-of-sight remaining blocked. The programing instructions for advancing the location of the entry line as the intermediate stop line the distance toward the nearest lane conflict, includes programming instructions that will cause the processor to advance the location of the intermediate stop line until the refined target distance from the nearest boundary of the nearest lane conflict is reached to form the inferred stop line.

In some embodiments, the system may further include programming instructions that will cause the processor to repeat the determining whether the line-of-sight of the vision system of the vehicle is blocked, the refining the target distance, and advancing the entry line until the refined target distance from the nearest boundary of the nearest lane conflict is reached. The process may repeat the determining, refining and the advancing until a first one of the line-of-sight is unblocked or the nearest boundary of the nearest lane conflict is reached.

In some embodiments, the programming instructions that will cause the processor to identify the nearest lane conflict may further comprise programming instructions that will cause the processor to identify a plurality of candidate lane segments into which the vehicle may enter when moving along the reference path to traverse the second road; and evaluate the plurality of candidate lane segments to determine which are appropriate nearest lane conflicts by: removing, from the candidate lane segments, any lane segment that merges with an outlet of the restricted lane, and removing, from the candidate lane segments, any lane segment that neighbors an inlet of the restricted lane. The programming instructions will cause the processor to select, from the appropriate nearest lane conflicts, the nearest lane segment into which the vehicle will enter when moving along the reference path to traverse the second road, as the nearest lane conflict.

In some embodiments, a method of inferring a stop line for a vehicle at an intersection is provided. The method may include, by a processor of a vehicle, while the vehicle is moving along a reference path on a first road in a geographic area, accessing map data comprising data representing a plurality of roads in the geographic area. The map data segments each of the roads into lane segments. While the vehicle is moving along the reference path, the method may include, by the processor, detecting from the accessed map data that a traffic control measure is located proximate an intersection that is ahead of the vehicle along the reference path; and determining whether a stop line for the detected traffic control measure is painted on the first road before or at the intersection. The method may include in response to determining that no stop line is painted on the first road before or at the intersection, identifying, as a restricted lane, a lane segment of the first road that (i) includes an entry line proximate a location of the traffic control measure and (ii) extends into the intersection. Inferring a stop line may include identifying, as a nearest lane conflict, a lane segment of a second road intersecting the first road at the intersection; and advancing a location of the entry line as an intermediate stop line a distance toward the nearest lane conflict until the intermediate stop line is at a target distance from a nearest boundary of the nearest lane conflict to form an inferred stop line.

In some embodiments, method may include, by the processor of the vehicle, causing the vehicle to decelerate and stop at a location in the restricted lane at or before the inferred stop line.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this disclosure, the term traffic control measure (TCM) refers to an object that is installed along, in, or over a lane of a road to control the flow of traffic by slowing and/or stopping the traffic under certain conditions. Examples of traffic control measures include a stop sign, traffic light signal, a yield sign, a pedestrian crosswalk, and a speed bump.

As used in this disclosure, the term "vector map" refers to a high-definition set of digital map data that represents roads using polygons that are split-up into smaller chunks called "lane segments." Each lane segment is represented by a polygon that has a lane centerline from which length and heading can be calculated. Each lane segment has a width.

As understood in this disclosure, the term "inferred stop line" is defined as a computer generated digital stop line placed near a location of a traffic control measure.

Definitions for additional terms that are relevant to this document are included at the end of this Detailed Description.

The embodiments provide methods and systems to determine an inferred stop line at a traffic control measure when there is no painted stop line at an intersection. The inferred stop line is used by the vehicle to help the vehicle determine how far to advance the front end of the vehicle along its travel lane within a certain target distance from either a leading edge of an intersecting lane or a crosswalk on the travel lane.

The methods and systems are described in FIGS. 1, 7, 8A-8B and 16. The method steps are performed in the order shown or a different order. One or more of the steps may be performed contemporaneously. Furthermore, one or more steps may be added or omitted in an iteration.

Figure 1:
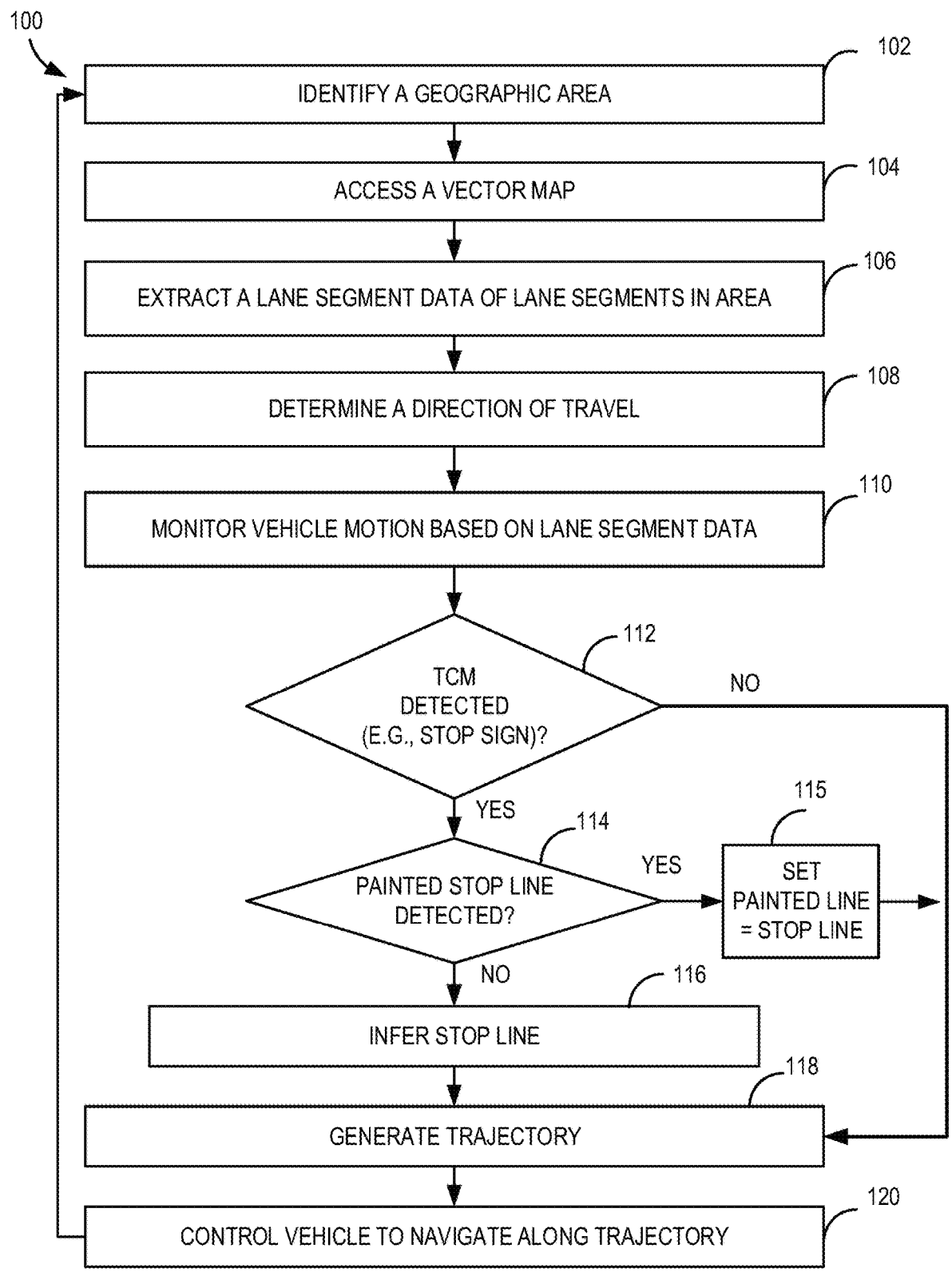
FIG. 1 illustrates a flow chart of an example method for navigating a vehicle along a path based on high-definition map data.

FIG. 1 illustrates a flow chart of an example method 100 for navigating a vehicle 150 (FIG. 2), such as an autonomous vehicle, along a reference path based on high-definition map data and inferred stop lines. The inferred stop lines assist the vehicle to navigate through a traffic control measure with an absent painted stop line. The vehicle includes a system 1600 (FIG. 16) with on-board computing device 1610 (FIG. 16).

In various embodiments, the high-definition map is a vector map. In an embodiment, the on-board computing device 1610 (FIG. 16) uses sensors 1635 (FIG. 16) to identify the current speed and direction of travel of the vehicle 150. The sensors 1635 may include cameras 1662 or a computer vision system to perceive objects in the environment.

As the vehicle is driven, the on-board computing device 1610 may identify (at 102) a geographic area in an immediate vicinity of a current location of the vehicle 150. The system 1600 does this by retrieving from a vehicle's location sensor 1660 (FIG. 16) global positioning system (GPS) data that includes coordinates of the current location, by receiving images of the current location from one or more on-board cameras 1662 and processing the images to identify one or more landmarks having known coordinates, and/or other procedures. The on-board computing device 1610 may access (at 104) a vector map that includes those lane segments in the geographic area and extract lane segment data 1672 (FIG. 16) associated with the plurality of lane segments (e.g., vehicle lanes) that are within the geographic area (at 106). The vector map is stored on-board the vehicle in a memory 1670 (FIG. 16), and the vector map includes coordinates that the on-board computing device 1610 uses to select the correct vector map that includes coordinates of the geographic area.

Figure 16:
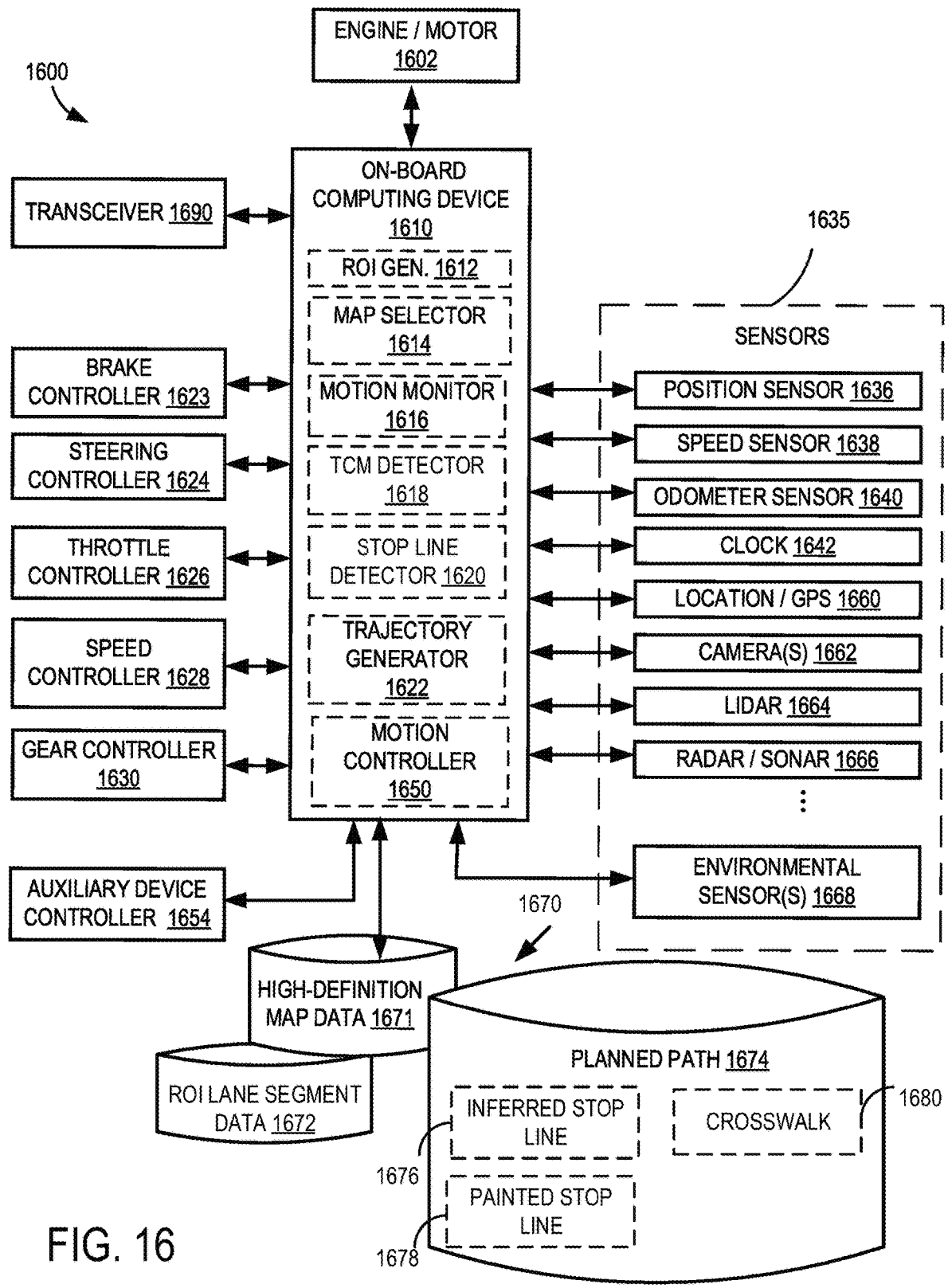
FIG. 16 illustrates an example system architecture with an on-board computing device for an autonomous vehicle.

The on-board computing device 1610 may determine (at 108) a direction of travel or heading computed for the vehicle 150 based on data received from one or more of the sensors 1635 (FIG. 16). The on-board computing device 1610 may monitor (at 110) the motion of the vehicle 150 based on the lane segment data 1672 (FIG. 16). The system 1600 (FIG. 16) collects real-time data associated with the vehicle to which the sensors 1635 are attached. The motion data monitored for the vehicle 150 includes, among other things, the current speed, acceleration, and/or the current direction of travel, for example, based on sensor data from the speed sensor 1638 (FIG. 16) and the location sensor 1660 (FIG. 16). The motion data also may indicate a state of the vehicle 150, such as alignment of the vehicle body with a lane (i.e., the orientation of the vehicle with respect to a lane segment).

The on-board computing device 1610 detects (at 112) whether there is an imminent traffic control measure ahead of the vehicle. The system 1600 may detect whether an imminent traffic control measure is ahead by determining whether a traffic control measure is present in the high-definition map data for any instantiation. Alternatively and/or in addition to, the system 1600 may process images captured and detected by the cameras 1662 or a computer vision system to detect whether the images include an imminent traffic control measure. Alternatively and/or in addition, the on-board computing device 1610 may receive notice of the traffic control measure via a vehicle-to-infrastructure (V2I) or other vehicle-to-everything (V2X)-type communication in which the traffic control measure emits signals to oncoming vehicles to alert the vehicle of its presence and status. In the case of a traffic light, the vehicle also determines whether the traffic control measure is actively signaling the vehicle to slow or stop (such as a red or yellow traffic light), or whether the traffic control measure will do so when the vehicle reaches the traffic control measure, based on a status indicator included in a V2X communication, or by using on-board cameras 1662 to detect and determine a state of the light.

Figure 7:
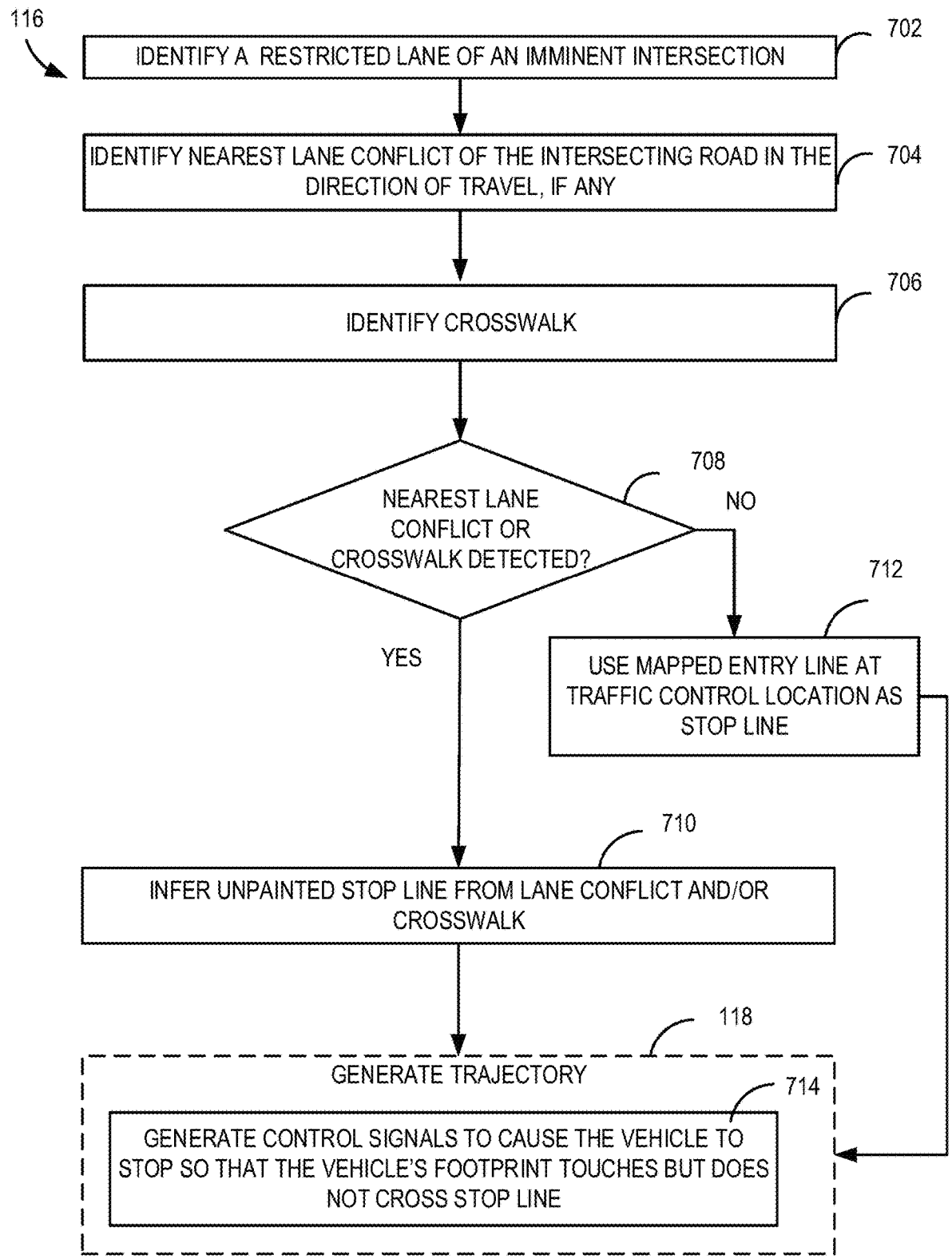
FIG. 7 illustrates a flow chart of an example method for inferring a stop line based on an unpainted stop line at a traffic control measure.
Figure 8A:
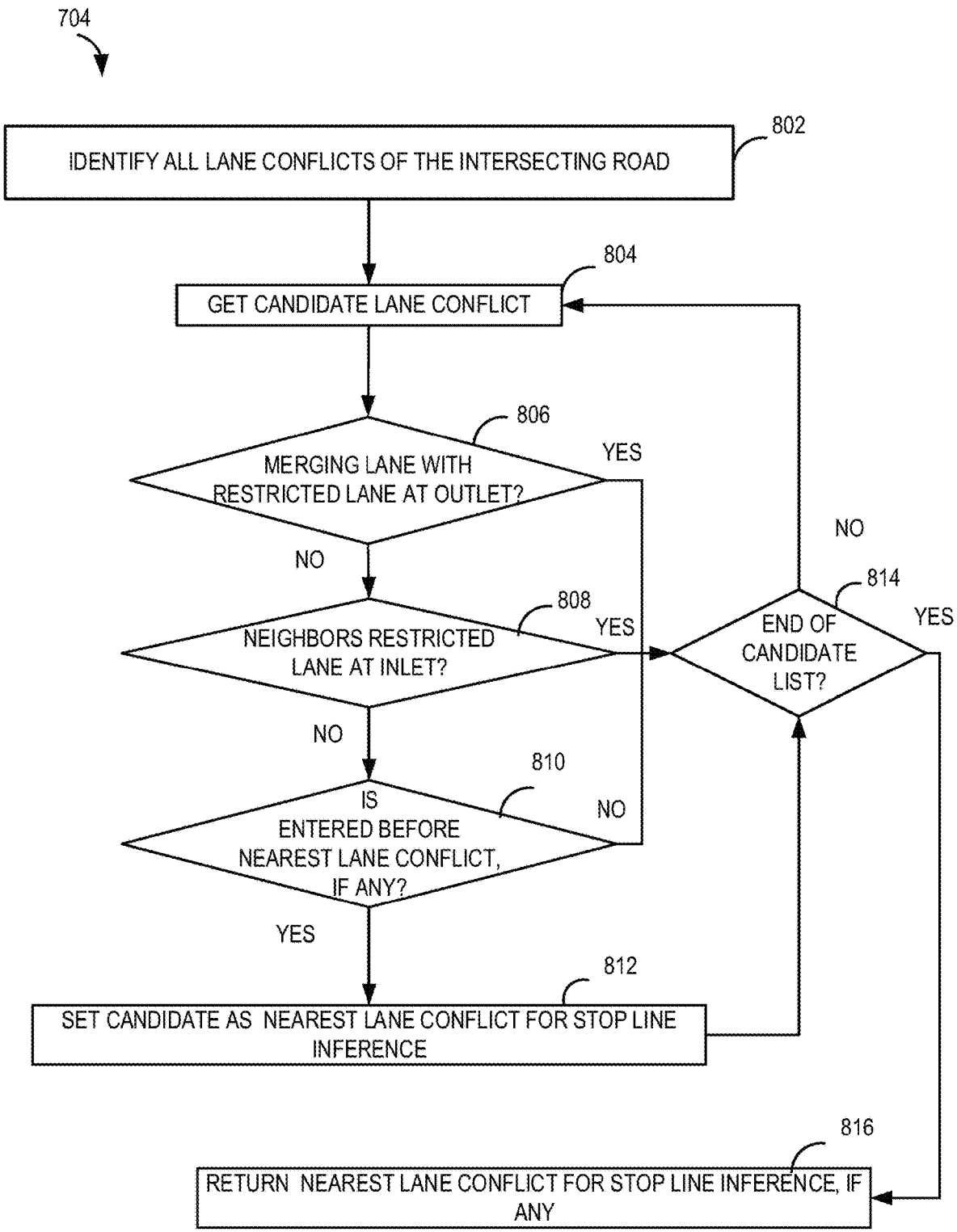
FIG. 8A illustrates a flow chart of an example method for identifying a nearest lane conflict of an intersecting road that is appropriate to use for stop line inference.
Figure 8B:
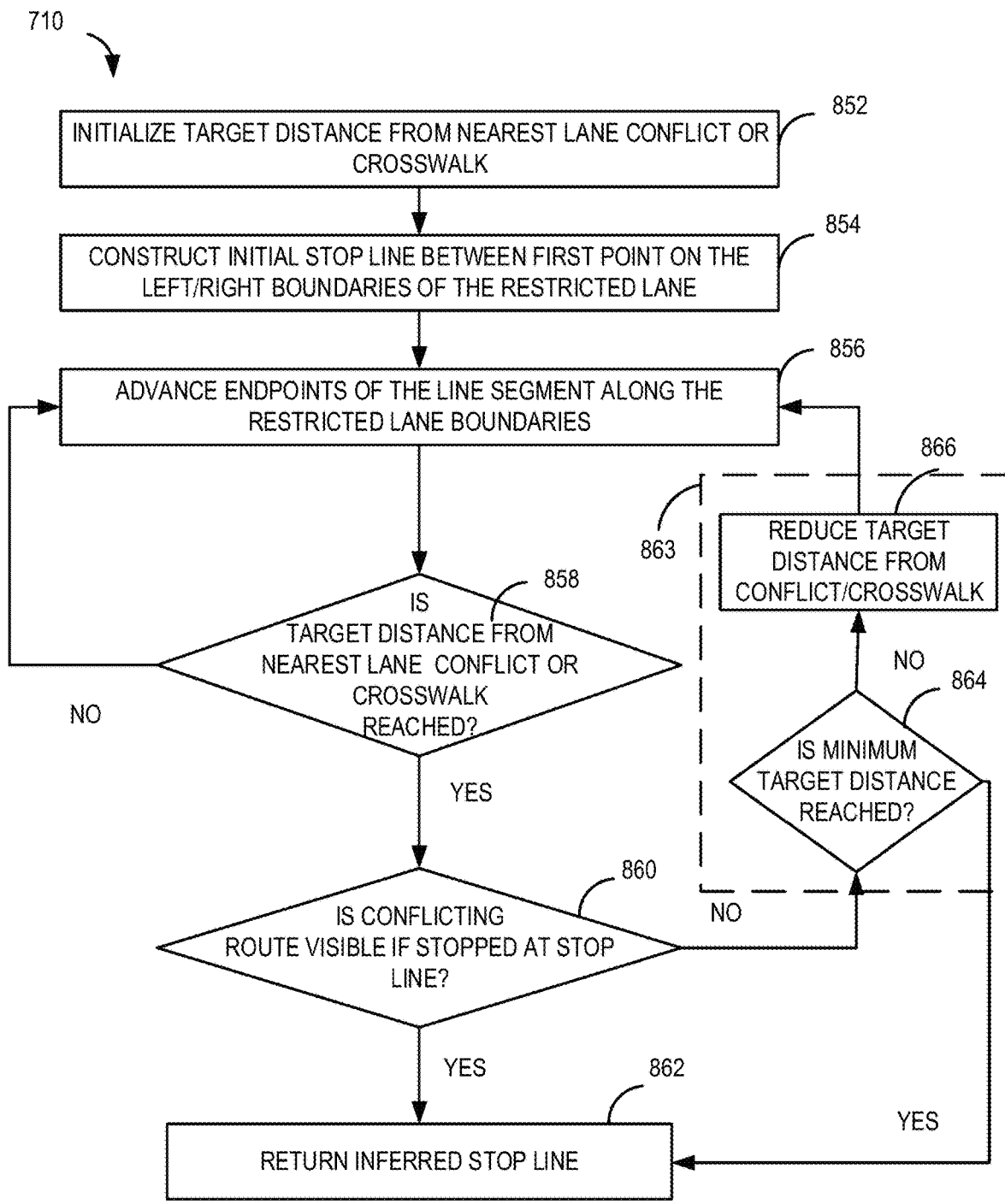
FIG. 8B illustrates a flow chart of an example method for inferring an unpainted stop line from a lane conflict and/or crosswalk.

If the determination (at 112) is "NO," then the on-board computing device 1610 may generate a trajectory, at 118. In general, the system 1600 continuously generates trajectories for the vehicle to move along a planned or reference path based on real-time data. If the determination (at 112) is "YES," then the on-board computing device 1610 may detect whether there is an unpainted stop line, at 114. The system 1600 detects whether there are painted stop lines by determining whether the camera 1662 detects painted stop line on the surface of the road and/or by retrieving data from a high-definition map for the vicinity, as will be described in relation to FIGS. 2-6. Alternatively and/or in addition, the on-board computing device 1610 may receive notice of painted stop line via a vehicle-to-infrastructure (V2I) or other vehicle-to-everything (V2X)-type communication in which the traffic control measure emits signals to oncoming vehicles to alert the vehicle of its presence and painted stop lines. If the determination (at 114) is "YES," then the detected painted stop line is set equal to the stop line, and then the on-board computing device 1610 generates a trajectory for the vehicle, at 118. However, if the determination (at 114) is "NO," then the on-board computing device 1610 infers a stop line (at 116). FIGS. 7 and 8A-8B illustrate an example method 116 for inferring a stop line.

The on-board computing device 1610 may generate a trajectory using a stop line (at 118). The stop line may be an inferred stop line or a painted stop line. The on-board computing device 1610 may control the vehicle to navigate along the generated trajectory (at 120) and then, return to identify the geographical area (at 102) and repeat the method 100.

Example intersections without painted stop lines are illustrated in FIGS. 2-6. Example intersections may include T-intersections, orthogonal intersection, and non-orthogonal intersections. The intersections may include crosswalks. The intersections may also have obstructions in the environment blocking a line-of-sight to an intersecting road. The examples of FIGS. 2-6 are described below to permit understanding of data generated for a high-definition map and should not be limiting in any way.

Figure 2:
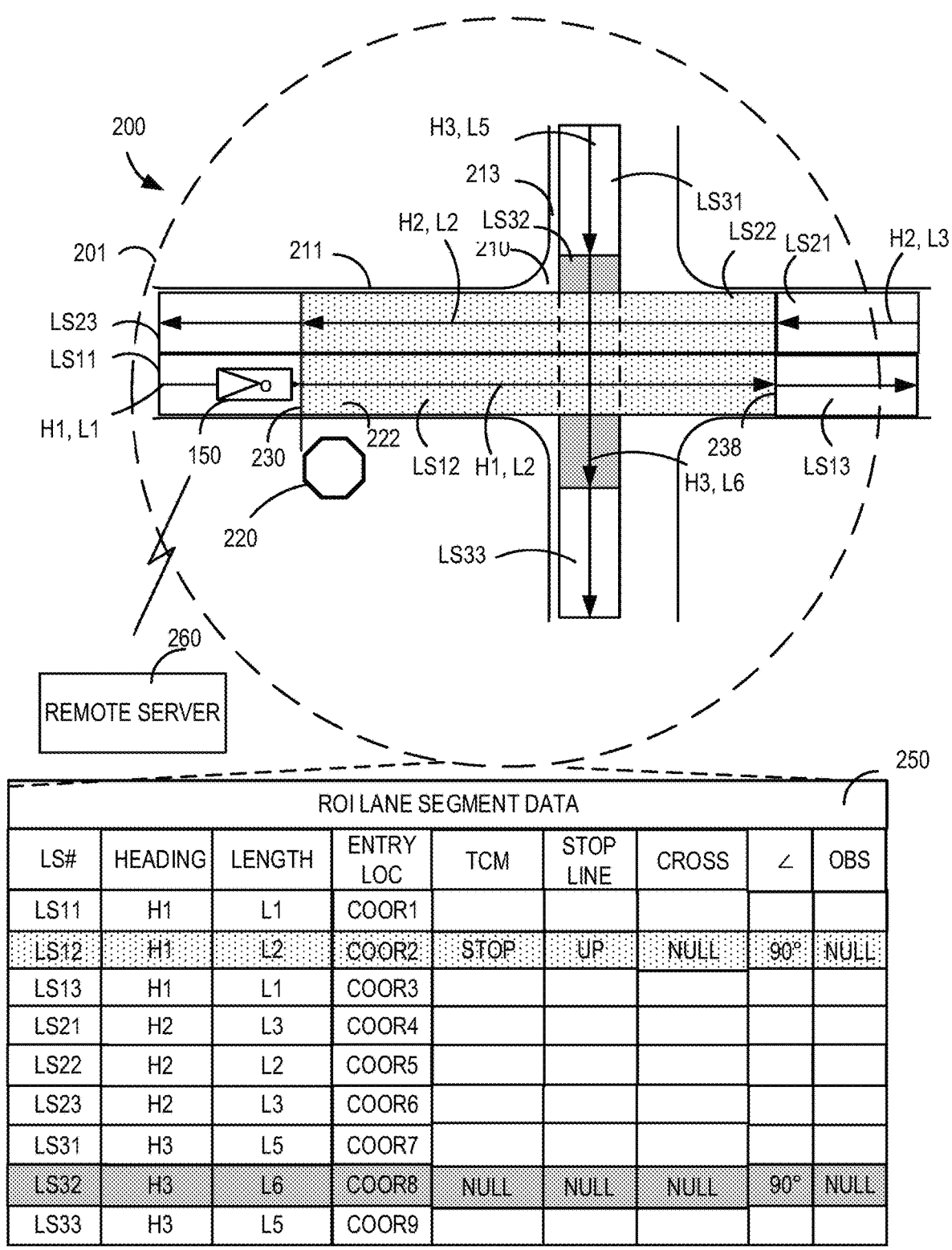
FIG. 2 illustrates an example diagram of a geographic area surrounding a vehicle and associated lane segment data of the area.

FIG. 2 illustrates an example diagram 200 of a geographic area 201 and associated lane segment data of vehicle lanes. FIG. 2 will be described in relation to FIG. 16. Specifically, a vehicle 150 is approaching an intersection 210 with a traffic control measure 220. The term geographic area 201 will sometimes be referred to as a region of interest (ROI).

For illustrative purposes, the geographic area 201 includes a first road (e.g., road 211) and a second road (e.g., road 213) intersecting at an intersection 210, which is an orthogonal intersection. Nonetheless, the geographic area 201 may have other combinations of roads types and traffic control measures.

In FIG. 2, vehicle lanes include one or more of the following: (1) a travel lane with the same heading that the vehicle 150 is currently traveling; (2) a lane with a heading that is opposite the heading (direction of travel) of the vehicle 150 and parallel and adjacent to the travel lane; or (3) any intersecting lane within a threshold distance from the current location of the vehicle 150.

In operation, the on-board computing device 1610 may access high-definition map data 1671 (FIG. 16) and select therefrom the ROI lane segment data 1672 that is representative of an example data set 250. The on-board computing device 1610 of vehicle 150 may communicate with a remote server 260, via various wireless communication protocols. The remote server 260 may provide to the on-board computing device 1610 the high-definition map and/or example ROI lane segment data set 250.

In some scenarios, an operator or technician enters data manually in a high-definition map. For example, if a traffic control measure 220 has no painted stop line, an operator may manually enter data in the high-definition map representative of the location of the traffic control measure. In this example, the traffic control measure 220 is a stop sign, denoted as "STOP" in the example data set 250. Each type of traffic control measure may have its own type data. Since there is no (absent) painted stop line on the road 211, an operator adds a restricted lane 222 (e.g., lane segment LS12), represented as dotted hatching. The restricted lane 222 may be represented as a polygon with an entry line 230 that begins with the location of a leading side of the traffic control measure 220, for example. The polygon of the restricted lane 222 extends through the intersection and ends with a departing line 238 on the other side of the intersection. Optionally, although not necessarily, the location of the entry line may be used as the location of an inferred stop line at which the vehicle 150 would stop. However, as shown in FIG. 2, in some instances, the location of the traffic control measure 220 is not always in close proximity (e.g., within a target distance) to the intersecting lane segment LS32 of road 213. In this case, the entry line 230 has an unnatural location further back from the intersection 210 and may thus not be an ideal location for an inferred stop line.

The example ROI lane segment data set 250 includes information in data fields associated with at least one of lane segment (LS) of the vehicle lanes. The information for each lane segment includes, for example, data fields for one or more of a lane segment number (LS #) data, heading data, length data, entry line location (ENTRY LOC) data, traffic control measure (TCM) data, stop line data, crosswalk (CROSS) data, angle (L) data and obstruction (OBS) data. Various intersection may include multiple obstructions, which would be entered in the example data set 250.

To prevent overcrowding in the example data set 250, certain data fields may remain blank. The data fields for a restricted lane from the perspective of vehicle 150 is shown in the example data set 250 with dotted hatching to correspond to the restricted lane 222. Based on the description below, lane segment LS32 is an example nearest lane conflict represented with gray shading in the geographic area 201. The nearest lane conflict will be described in more detail in relation to FIG. 8A. In the example data set 250, the data fields for lane segment LS32 have gray shading. Each lane segment is represented as a polygon with heading data and length data. The heading data is represented as the arrow placed along a center of the polygon. In the example of FIG. 2, to prevent crowding in the figure, in some instances, the heading and length data labels are omitted from the geographical area.

The example data set 250 for those lane segments in the geographic area 201 may include lane segments LS11-LS13, LS21-LS23 and LS31-LS33. The lane segments LS11-LS13 have a heading H1 that correspond to the heading of the vehicle 150 in its travel lane. For discussion purposes, a polygon with a triangle denotes the vehicle 150 in the figure. The polygon represents a scaled version of the size of the vehicle. The apex of the triangle is associated with the current heading of the vehicle 150. The circle at the apex denotes a vehicle location, such as a center of the vehicle. Heading H1 is an East heading, as the arrow points to the right of the page.

Lane segments LS21-LS23 are adjacent and parallel to lane segments LS11-LS13 but have a heading H2 that is in an opposite direction of heading H1 of the vehicle 150. Accordingly, for this example, one or more of lane segments LS21-LS23 may be a neighboring lane segment relative to lane segments LS21-LS23. Heading H2 is a West heading, as the arrow points to the left of the page. Lane segments LS31-LS33 have a heading H3 that intersect headings H1 and H2, for example. Heading H3 is a South heading, as the arrow points toward the bottom of the page. A north heading (not shown in FIG. 2) points toward the top of the page. The heading data may describe a heading direction in terms of the four cardinal directions: North, South, East and West. However, because roads and their lane segments are oriented in various directions relative to North, South, East and West, the heading data is representative of angles or radians relative to the four cardinal directions, for example. Thus, in this document the terms "North," "South," "East" and "West" are merely intended to indicate relative directions of heading and not necessarily strictly "North," "South," "East" and "West." Furthermore, in FIG. 2, all lane segments are straight and have a single heading value, but in practice, not all lane segments are straight, such that the heading varies as a function of distance along the lane segment.

All of the lane segments may be the same length or different lengths. As an example, the lane segments LS11 and LS13 have a length L1. The lane segments LS21 and LS23 have a length L3. The lane segments LS31 and LS33 have a length L5. Lane segments of an intersection (i.e., intersection 210) that intersect may have different lengths or the same lengths. However, the length of intersecting lane segments may extend across the intersection 210. In the illustration of FIG. 2, the lane segments LS12 and LS32 intersect. Lane segment LS12 has a length L2. Lane segment LS32 has a length L6. The data set 250 may include the width of each lane segment but this data is not shown here to prevent overcrowding in the figure. In practice, the width of a lane segment can vary.

The example data set 250 of those lane segments in the geographic area 201 may include geographic map coordinates for an entry line location of the polygon associated with each of the lane segments LS11-LS13 on road 211, lane segments LS21-LS23 on road 211 and lane segments LS31-LS33 on road 213. The entry line location corresponds to a boundary of polygon from which a vehicle would first approach or enter the lane segment. In the example, the entry line location to the polygon of lane segment LS12 is also denoted as unpainted. The geographic map coordinates COOR1, COOR2, and COOR3 are location coordinates for the entry lines of the lane segments LS11-LS13. The geographic map coordinates COOR4, COOR5, and COOR6 denote location coordinates for the entry lines of the lane segments LS21-LS23. The geographic map coordinates COOR7, COOR8, and COOR9 denote location coordinates for the entry lines of the lane segments LS31-LS33.

Figure 11:
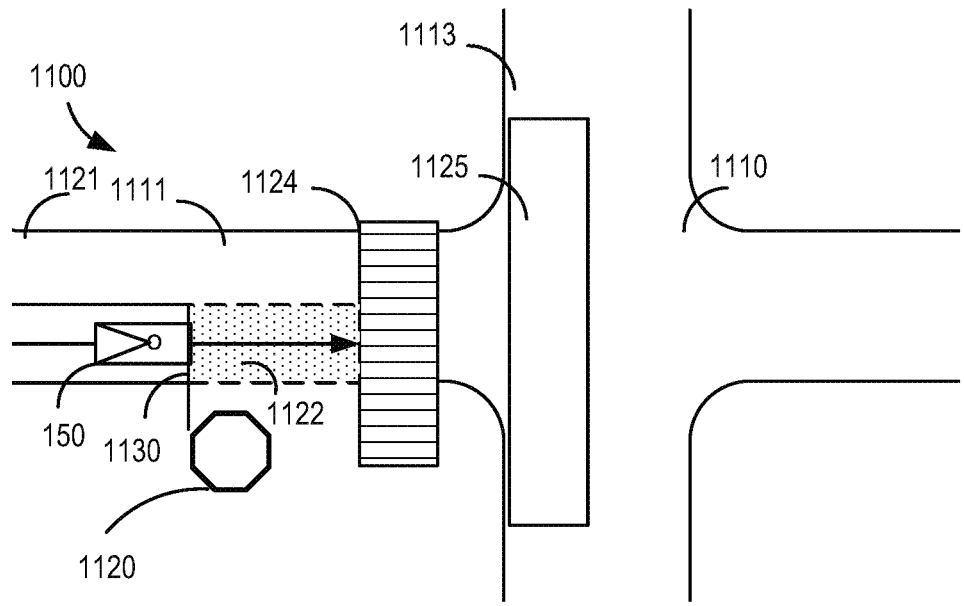
FIG. 11 illustrates an example diagram of a vehicle at an intersection having an unpainted stop line at a traffic control measure with a nearby crosswalk.
Figure 12:
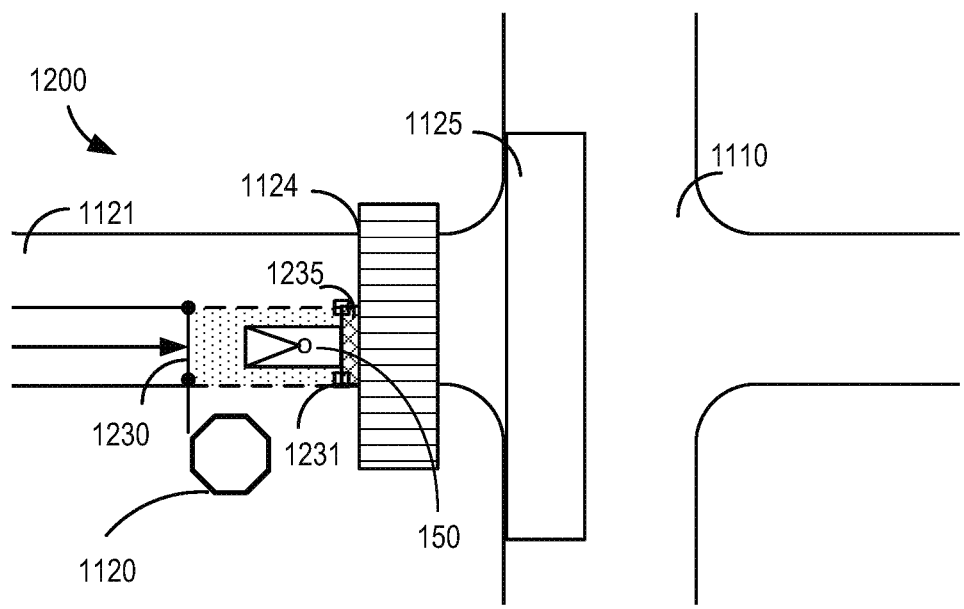
FIG. 12 illustrates an example diagram of a vehicle at the intersection of FIG. 11 with an overlaid inferred stop line prior to the crosswalk.
Figure 15:
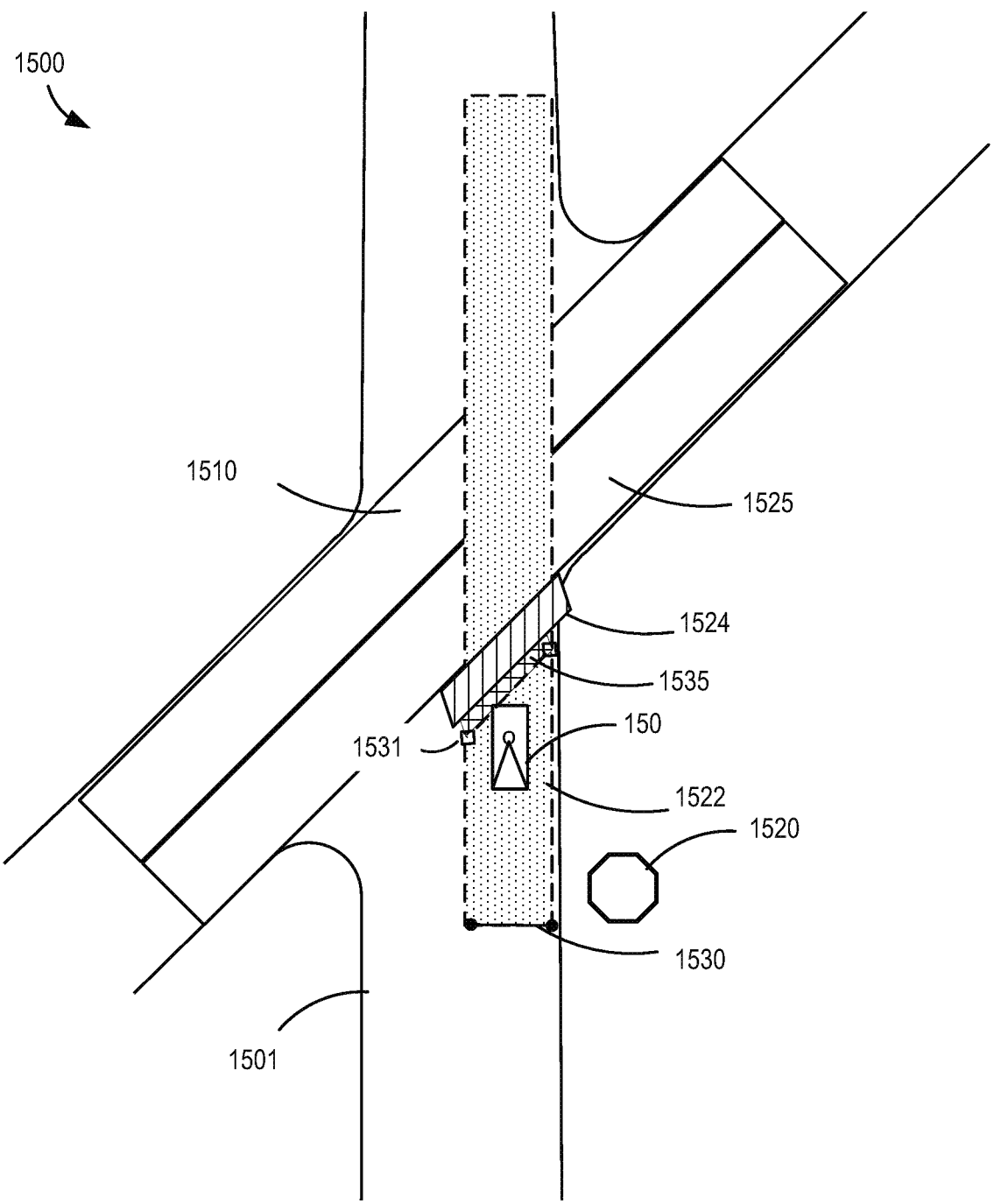
FIG. 15 illustrates an example diagram of a vehicle at a non-orthogonal intersection with an inferred stop line prior to the crosswalk.

In FIG. 2, the example diagram 200 does not include a crosswalk. For the purposes of illustration, the data set 250 may represent the absence of a crosswalk as "NULL" in a corresponding row of a lane segment (i.e., lane segment LS12) with a traffic control measure. However, if a painted crosswalk is at the intersection 210, then the example data set 250 may include coordinates representative of a crosswalk entry line. Crosswalk scenarios are shown in FIGS. 11-12 and 15. In other scenarios, the crosswalk location is derived in real-time by the on-board sensors, such as cameras 1662 or a LIDAR system 1664. Painted crosswalks are generally located before intersections or different traffic control measures, such as traffic lights, stop signs, and yield signs.

An orthogonal intersection includes generally perpendicularly intersecting road 211 and 213. In data set 250, the angle (L) data of 90° may indicate that the intersection is an orthogonal intersection. In FIG. 2, no obstruction is present in the geographical area 201 that will prevent the AV from viewing the intersecting lane. Accordingly, in data set 250 the data field for an obstruction (OBS) is denoted as "NULL." However, if an obstruction is present, identifiers may be used to identify a boundary of the obstruction that is adjacent to the intersection, for example. Intersections may include various obstructions along different sides of road 211, for example. In other scenarios, the obstruction data is derived in real-time by the on-board sensors, such as cameras 1662 or LIDAR system 1664.

Figure 3:
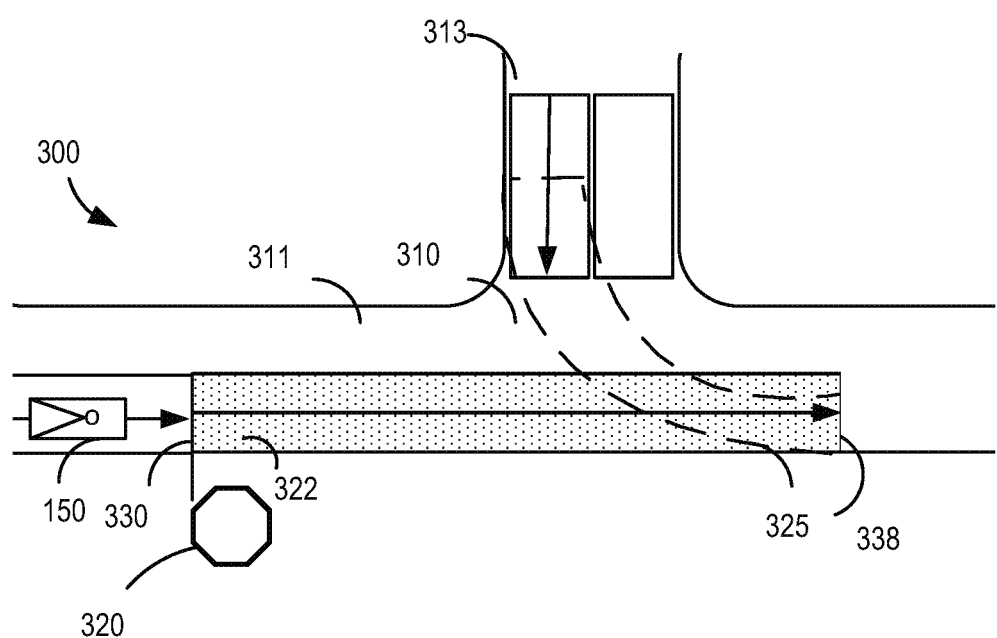
FIG. 3 illustrates an example diagram of a vehicle at a T-intersection with an unpainted stop line at a traffic control measure.
Figure 4:
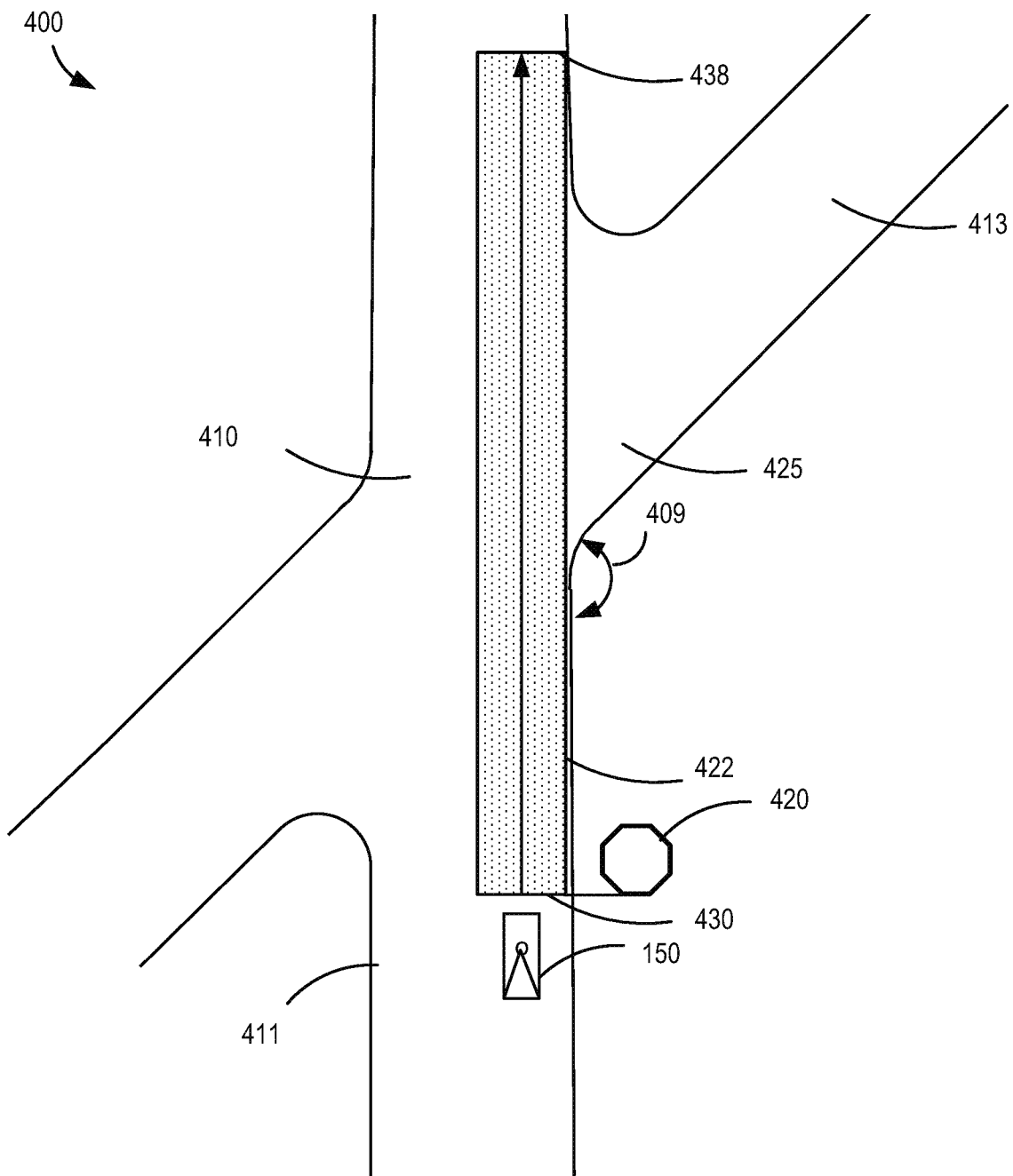
FIG. 4 illustrates an example diagram of a vehicle at a non-orthogonal intersection with an unpainted stop line at a traffic control measure.

FIGS. 3 and 4 illustrate other examples of intersection types described below.

FIG. 3 illustrates an example diagram 300 of a vehicle 150 approaching a T-intersection 310 with a traffic control measure 320 but no painted stop line. By way of non-limiting example, an operator may add in the high-definition map the restricted lane 322 with an entry line 330 that begins near the location of the traffic control measure 320. The restricted lane 322 may include a departing line 338 on the other side of the intersection. A T-intersection 310 corresponds to roads 311 and 313 that intersect each other, such that one of the roads (i.e., road 313) ends in the T-intersection 310. In the illustration, the curved path, denoted in dashed lines, represents a merging lane conflict 325; and the restricted lane 322 extends through the intersection 310. This causes both a portion of the restricted lane 322 and merging lane conflict 325 to overlap, as will be described in more detail in relation to FIGS. 7 and 8A.

FIG. 4 illustrates an example diagram 400 of a vehicle 150 approaching a non-orthogonal intersection 410 with a traffic control measure 420. The vehicle may have access to high-definition map data that includes a restricted lane 422 with an entry line 430 that begins near the location of the traffic control measure 420. The restricted lane 422 may include a departing line 438 on the other side of the intersection. In the illustration, the intersecting road 413 is at an angle 409 relative to the entry line 430 of road 411. The lanes of the non-orthogonal intersection intersect at an angle other than 90°. With reference to the data set 250 (FIG. 2), the angle data may denote the angle 409 of the restricted lane 422 to the crossing street 425.

Figure 5:
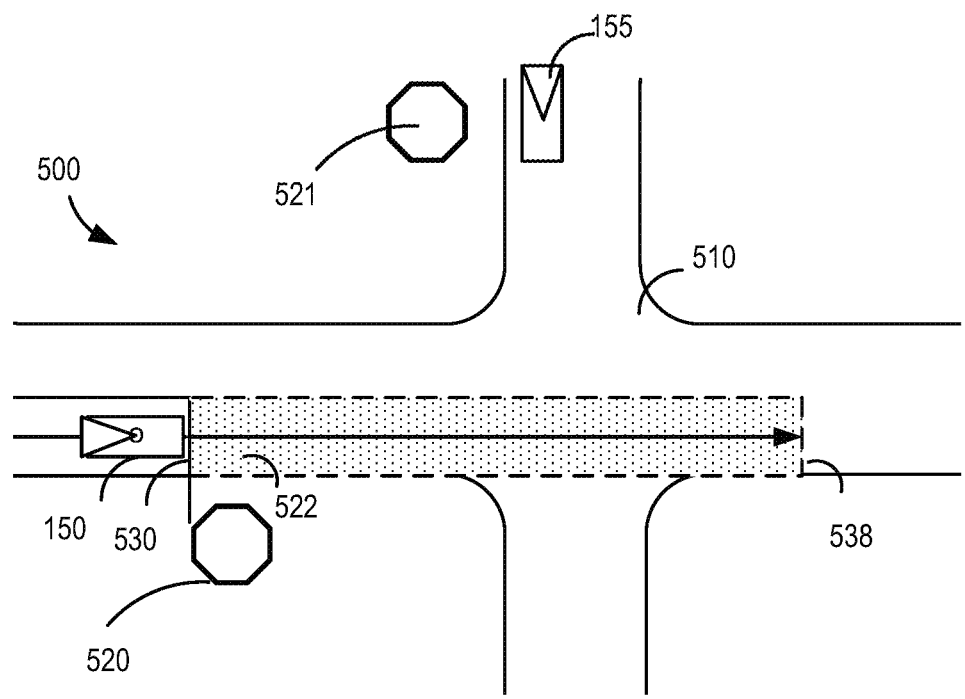
FIG. 5 illustrates an example diagram of a vehicle at an intersection with two-way traffic control measures.

The illustrations of FIGS. 2-4 represent example intersections having a traffic control measure (e.g., traffic control measure 220, 320 or 420) with no painted stop line at a one-way stop intersection. Nonetheless, the disclosure applies to other intersection configurations not described herein. For example, a single intersection can have both orthogonal and non-orthogonal intersecting roads. The intersection may include two-way traffic control measures or four-way traffic control measures. FIG. 5 illustrates an example of a two-way traffic control measure. The systems and methods described herein apply to all types of intersections and especially, those with unpainted stop lines.

FIG. 5 illustrates an example diagram 500 of a vehicle 150 stopped at an intersection 510 with two-way traffic control measures 520 and 521. The operator may add in a high-definition maps data representative of a restricted lane 522 with an entry line 530 that begins with the location of the traffic control measure 520. The restricted lane 522 may include a departing line 538 on the other side of the intersection. When the vehicle 150 stops at the physical traffic control measure 520, other road users (e.g., vehicle 155) may not realize that the vehicle 150 is present or stopped and waiting their turn. In such a scenario, vehicle 155 after stopping at the physical traffic control measure 520 may proceed out of turn.

Assume that in a scenario, a human drives the vehicle 155. When there is no (absent) painted stop line, human drivers typically stop their vehicle 155 somewhere within a "stop zone" between the location of the traffic control measure 521 and a point of entry into the intersection 510. If there is a crosswalk on the near side of the intersecting roadway, human drivers will typically stop their vehicle 155 between the sign location and the point of entry into the painted crosswalk.

Figure 6:
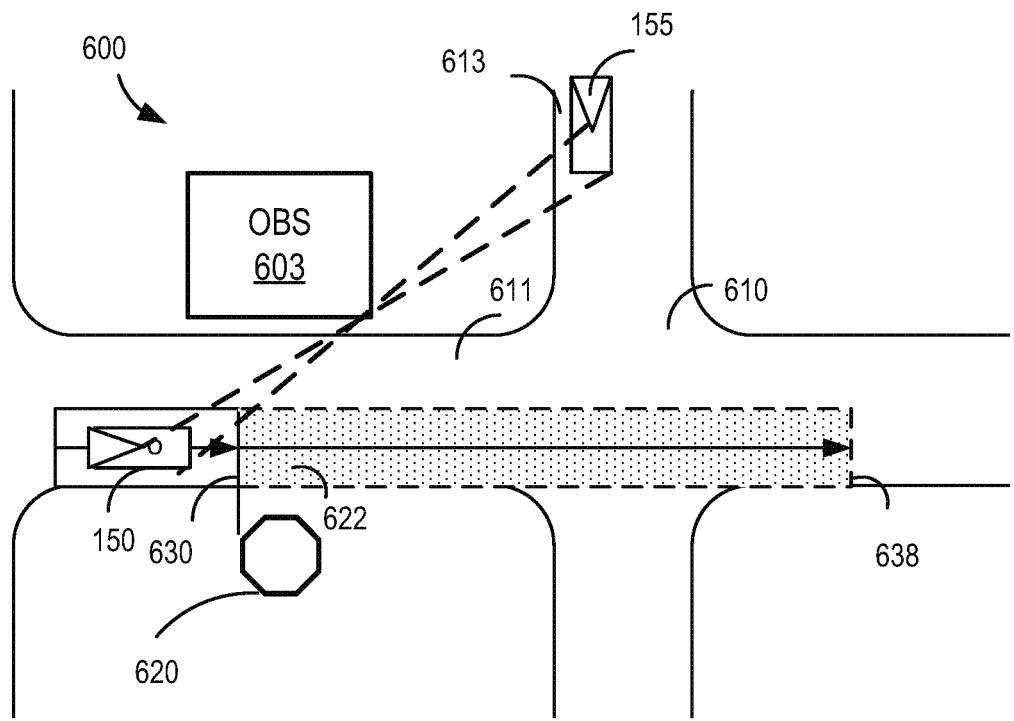
FIG. 6 illustrates an example diagram of a vehicle at an occluded intersection.

FIG. 6 illustrates an example diagram 600 of a vehicle 150 approaching an occluded intersection 610. In this example, an obstruction 603 is blocking the line of sight between vehicle 150 and a portion of an intersecting road 613 that has another vehicle 155 driving toward the intersection. The high-definition map data or the perception data may identify a geographic location of the obstruction 603 relative to the road 611 and/or the restricted lane 622 and/or intersecting road 613. An autonomous vehicle 150 if stopped at an entry line 630 may be prohibited from having a line-of-sight to the vehicle 155 because of the obstruction 603. The intersecting road 613 may be a conflicting route. Specifically, the view of the on-board cameras 1662 (FIG. 16) may be occluded by the obstruction 603. Data associated with the obstruction may identify a boundary nearest the intersection that would unblock visibility of the cameras 1662. Accordingly, at occluded intersections, the system 1600 may have difficulty in determining when it is safe for the vehicle 150 to proceed through the intersection 610.

At an occluded intersection, the view associated with (i.e., from the perspective of a driver or camera of) vehicle 155 may also be occluded, such as if the vehicle 155 was stopped far back from the intersection 610. In some scenarios, it may appear to the driver or autonomous system of vehicle 155 that the vehicle 150 is running a stop sign.

Based on the above examples, a method for inferring a stop line to address the challenges of the absence of painted stop lines is shown in FIG. 7.

Figure 10:
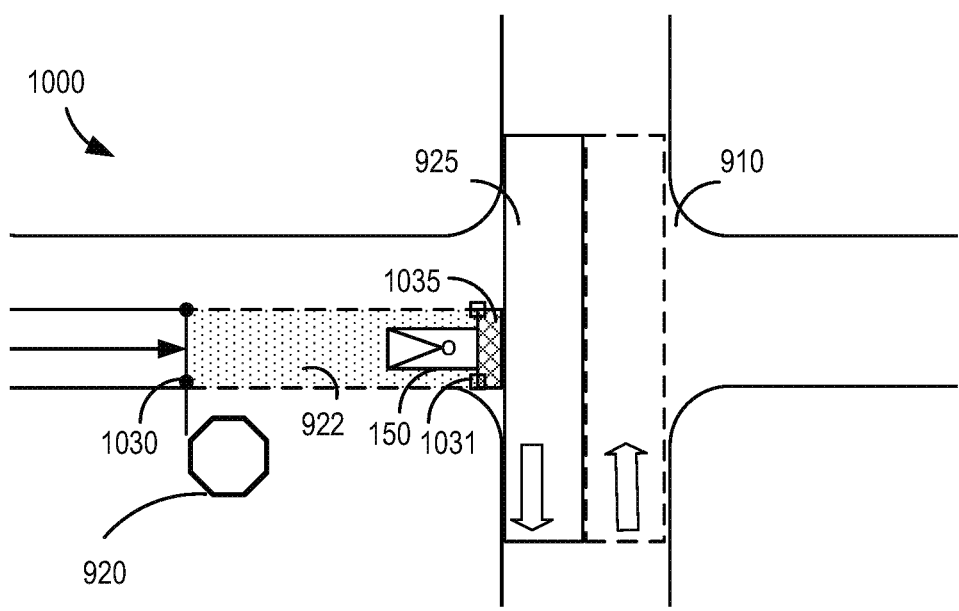
FIG. 10 illustrates an example diagram of a vehicle at the intersection of FIG. 9 with an overlaid inferred stop line prior to a lane conflict.

FIG. 7 illustrates a flow chart of an example method 116 for inferring a stop line at an intersection that contains a traffic control measure. When inferring the stop line, the system 1600 may use one or more of the following: i) a first target distance from a leading edge or boundary of a nearest lane conflict, as shown in FIG. 10; and ii) a second target distance from a leading edge or (nearest) boundary of a crosswalk, as shown in FIG. 12.

In various embodiments, at least one target distance may be manually tuned or learned using a machine learning algorithm. The machine learning algorithms may use human driving data. Human-driving data may be derived from human drivers stopping at a particular intersection or particular intersection type. Furthermore, target distances may vary based on the specific configuration of the intersection.

The method 116 may be performed by the on-board computing device 1610, off-board by the remote server 260 (FIG. 2), off-board by another computing system or a combination thereof. Certain computations of the method 116 may be performed off-board so that the latency of the autonomous driving controlled by the on-board computing device 1610 is not affected.

The on-board computing device 1610 may identify a restricted lane of an imminent intersection (at 702). The on-board computing device 1610 may identify, as a restricted lane, a lane segment of a first road that includes an entry line (e.g., the entry of the restricted lane as noted in associated map data) at a location of the traffic control measure and that extends into the intersection. The on-board computing device 1610 may do this by searching the high-definition map data for data associated with the road and/or lane in which the vehicle is traveling, to retrieve data associated with the restricted lane. The on-board computing device 1610 may identify in the direction of travel a nearest lane conflict of the intersecting road, if any (at 704). The system 1600 may identify the nearest lane conflict by searching the high-definition map data for data associated with the neighboring lane segments, merging lane segments and intersecting lane segments of an intersection the vehicle 150 is approaching, as will be described in FIG. 8A.

The on-board computing device 1610 may identify a crosswalk (at 706). For example, the on-board computing device 1610 may identify a crosswalk based on data from the high-definition map and/or images (perception data) captured of the painted crosswalk by the cameras 1662 or computer vision system of vehicle 150. The on-board computing device 1610 may detect whether there is a nearest lane conflict or a crosswalk (at 708). If the determination (at 708) is "YES," the on-board computing device 1610 may infer an unpainted stop line from the lane conflict and/or crosswalk (at 710). The process for inferring the unpainted stop line will be described in relation to FIG. 8B. The on-board computing device 1610 may generate a trajectory (at 118 of FIG. 1) based on the unpainted stop line. At 714, when generating the trajectory, the on-board computing device 1610 may generate control signals to cause the vehicle 150 to stop so that the vehicle's footprint touches but does not cross the (inferred) stop line.

If the determination (at 708) is "NO," the on-board computing device 1610 may use a mapped entry line at the location of the traffic control measure as the stop line (at 712). The on-board computing device 1610 may generate a trajectory (at 118 of FIG. 1) based on the mapped entry line as the stop line.

FIG. 8A illustrates a flow chart of an example method 704 for identifying a nearest lane conflict of an interesting road. The on-board computing device 1610 may exclude those lane conflicts that are neighbors of or merge with the restricted lane at the inlet (i.e., entry line) or outlet (i.e., departing line) identified for vehicle 150 (at 704). The on-board computing device 1610 may identify all lane conflicts of the intersecting road (at 802) to generate a candidate lane conflict list. The on-board computing device 1610 may evaluate which candidate lane conflicts are appropriate nearest lane conflicts in the list by excluding neighboring and/or merging lane conflicts.

To exclude neighboring or merging lane conflicts from the candidate list, the on-board computing device 1610 may retrieve a candidate lane conflict (at 804) and determine if the candidate lane conflict is not merging (at 806, NO) with the restricted lane at the outlet and if the candidate lane conflict does not neighbor (at 808, NO) the restricted lane at the inlet. If the candidate lane conflict, under evaluation, is neither merging nor neighboring the restricted lane, then the candidate lane conflict is an appropriate candidate lane conflict to use to infer the unpainted stop line. However, the appropriate candidate lane conflicts may be subsequently evaluated to determine the nearest of the appropriate candidate lane conflicts (at 810). The lane conflict 325 (FIG. 3) is an example of a merging lane conflict candidate. The lane conflict 1437 (FIG. 14A) is an example of a conflict that neighbors the restricted lane at the inlet. If the determination (at 806) is "YES," the merging lane is not a candidate lane conflict. The on-board computing device 1610 may then determine whether the end of the candidate list is reached (at 814). The "outlet" refers to the exit side of a lane segment in an intersection, and the "inlet" refers to an entry side, based on the intended direction of travel through the lane segment.

If the determination (at 806) is "NO," then a determination is made whether the candidate lane conflict is a neighboring restricted lane at an inlet of an intersection that includes the lanes (at 808). If the determination (at 808) is "YES," the neighboring lane is not a candidate lane conflict. Then the on-board computing device 1610 may determine whether, the end of the candidate list is reached (at 814). If the determination (at 808) is "NO," then a determination is made whether the candidate lane conflict is entered before the nearest lane conflict, if any (at 810). If the determination (at 810) is "NO," the candidate lane conflict is not a nearest lane conflict, and then a determination is made whether the end of the candidate list is reached (at 814). If the determination (at 810) is "YES," the candidate lane conflict is set as the nearest lane conflict (at 812) and the process may loop to 814 to check other candidate lane conflicts. Specifically, the nearest lane segment into which the vehicle will enter when moving along the reference path to traverse the second road may be determined as the nearest lane conflict.

If the determination (at 814) is "NO," then the on-board computing device 1610 may retrieve a candidate lane conflict (at 804) and repeat the process to find a nearest lane conflict, if any. If the determination (at 814) is "YES," then the on-board computing device 1610 returns the nearest lane conflict for the stop line inference process (at 816) for use by the method described in FIG. 8B.

Lane segments LS22 and LS23 (FIG. 2) are examples of neighboring lanes but these lanes are not neighboring the restricted lane at an inlet. As will be seen from FIGS. 9-15, the departing line of the restricted lane may be adjusted to an inferred clear line where the vehicle 150 is sufficiently out of the intersection to not block the flow of traffic. The methods to infer the stop line may be used to infer a clear line.

FIG. 8B illustrates a flow chart of an example method 710 for inferring an unpainted stop line from a lane conflict and/or crosswalk. The on-board computing device 1610 may initialize the target distance from the nearest lane conflict or crosswalk (at 852). The target distance at any intersection may be based on one of a crosswalk or a nearest lane conflict. For example, in a scenario with a nearest lane conflict, a (first) target distance may be 1 meter (m) from a front (distal) end of the vehicle 150 (FIG. 10) to the leading edge of the identified nearest lane conflict. In a scenario with a crosswalk, a (second) target distance may be 0.5 m from the front (distal) end of the vehicle 150 (FIG. 12) to the leading edge of the identified crosswalk from the perspective of vehicle 150. As described above, the crosswalk, if present, may be obtained either from the high-definition map or by perception data.

Figure 9:
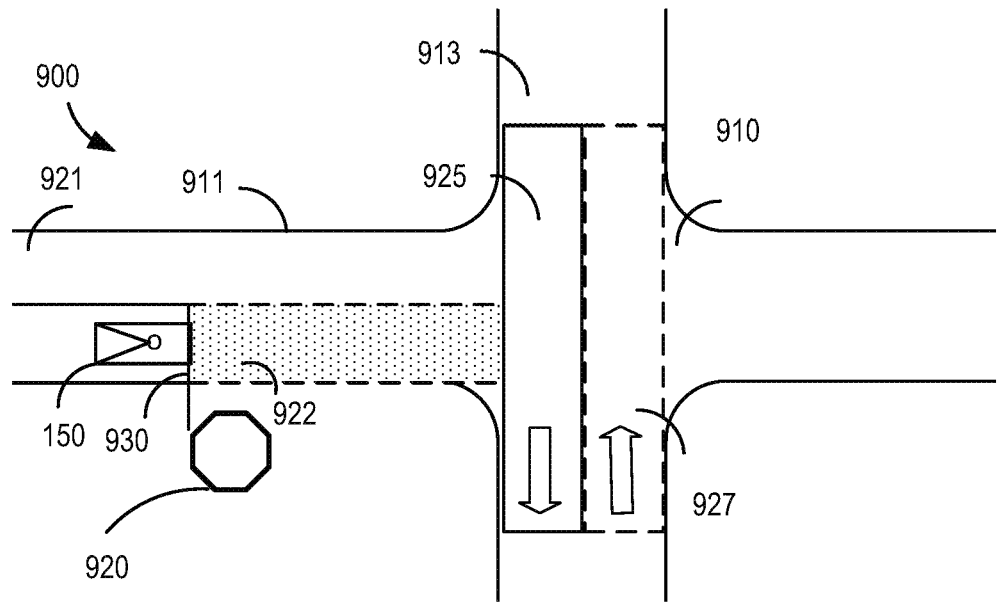
FIG. 9 illustrates an example diagram of a vehicle at an intersection having an unpainted stop line at a traffic control measure.

The on-board computing device 1610 may construct an initial stop line between the first point on the left and right boundaries of the restricted lane (at 854). In FIG. 9, an example initial stop line or entry line 930, denoted by a line segment 1030 ending in black circles, as shown in FIG. 10. The black circles may represent "endpoints" of the line segment. The on-board computing device 1610 may advance the endpoints of the line segment 1030 along the restricted lane boundaries (at 856). The on-board computing device 1610 may determine whether the line segment 1030 has reached the target distance from the nearest lane conflict or the crosswalk. By way of non-limiting example, Brent's method or other root finding methods may be used to advance the endpoints along the lane boundaries and find a stop line at the target distance. If the determination (at 858) is "NO," then the on-board computing device 1610 may return to continue advancing endpoints (at 856). If the determination (at 858) is "YES," then the on-board computing device 1610 may determine whether a conflicting route (i.e., road 613 of FIG. 6) is visible if the vehicle 150 is stopped at the stop line (at 860), as will be discussed in more detail in relation to FIG. 13. The on-board computing device 1610 may determine visibility using perception data. If the determination (at 860) is "YES," then the on-board computing device 1610 may return the inferred stop line (at 862) for use in generating the trajectory (at 118 of FIG. 1). If the determination (at 860) is "NO," then the on-board computing device 1610 may perform a refinement process 863 denoted in dashed lines to the target distance. At 863, the on-board computing device 1610 determine if the minimum target distance is reached (at 864). If the determination (at 864) is "YES," then the on-board computing device 1610 may return the inferred stop line (at 862) for use in generating the trajectory (at 118 of FIG. 1). If the determination (at 864) is "NO," then the on-board computing device 1610 may reduce the target distance from the nearest lane conflict or the crosswalk (at 866). The on-board computing device 1610 may continue advancing the endpoints (at 856). In some embodiments, the target distance may be refined so that visibility of a conflicting route can be achieved. The refinement process (at 863) may end when the conflicting route is visible if stopped at the stop line, or when the minimum target distance is reached. For example, if the minimum target distance were zero, the refinement process may end with an inferred stop line exactly at the lane conflict or crosswalk, if visibility of the conflicting route is not achieved prior to that.

In various embodiments, the inferred stop line location can be refined on-board the vehicle using the on-board computing device 1610. For example, a location of an inferred stop line may be computed from the off-board processing, by a remote server, and the on-board computing device 1610 may perform the refining process (at 863) until an unblocked visibility criteria is satisfied, for example. The refined inferred stop line may be determined with respect to perceived objects detected by the cameras 1662 in the environment that are not permanently in the high-definition map data. For example, a building, bridge, or tree may be a permanent obstruction. A truck or other movable object could be perceived in real-time by the sensors such as cameras 1662 or LIDAR system 1664.

The methods 100, 116, and 118 may be implemented using hardware, firmware, software or a combination of any of these. For instance, methods 100, 116, and 118 may be implemented as part of a microcontroller, processor, and/or graphics processing units (GPUs) and an interface with a register, data store and/or memory 1670 (FIG. 16) for storing data and programming instructions, which when executed, performs the steps of methods 100, 116, and 118 described herein.

Example scenarios shown in FIGS. 9-15 show certain aspects of the method for inferring stop lines as described in FIG. 7. In the examples, the restricted lanes are denoted in dotted hatching. The line segment at the entry line or unpainted stop line is denoted as a dumbbell where the line segment includes a solid line that ends with shaded black circles placed at side boundaries of the restricted lane. The line segment at the entry line will sometimes be referred to as "an intermediate stop line." The advancement of the line segment is in the direction of travel of vehicle 150. Each intermediate stop line is constrained to be equidistant at both ends from the nearest boundary of the lane conflict or crosswalk. The target distance is denoted as cross-hatched area. The inferred stop line is denoted as a solid line ended with unshaded squares.

FIG. 9 illustrates an example diagram 900 of a vehicle 150 at an intersection 910 having an unpainted stop line or entry line 930 at a traffic control measure 920. FIG. 10 illustrates an example diagram 1000 of a vehicle 150 at the intersection 910 of FIG. 9 with an overlaid inferred stop line 1031 prior to a lane conflict 925. The line segment 1030 is shown as initialized at the unpainted stop line or entry line 930 of the traffic control measure 920. The intersection 910 is an example orthogonal intersection.

For illustrative purposes, the intersection includes a first road (e.g., road 911) intersecting with a second road (e.g., road 913). Lane 921 is a neighboring lane relative to the restricted lane 922. Lane segment denoted at 925 is an example of a nearest lane conflict at the inlet from the perspective of vehicle 150. By way of non-limiting example, lane segment 927 is parallel to and lane segment 925 and a heading that is opposite that of lane segment 925. In FIG. 10, the vehicle 150 is advanced to the inferred stop line 1031 with an area denoted as a first target distance 1035 on the near side of the lane conflict. The trajectory may be configured to stop the vehicle 150 so that the front end of the vehicle does not cross the inferred stop line 1031. The system 1600 determines the location of the vehicle 150, such as relative to the location of the circle on vehicle 150. As used herein, the near side is closest to the front end of the vehicle 150.

FIG. 11 illustrates an example diagram 1100 of a vehicle 150 at an intersection 1110 having an unpainted stop line or entry line 1130 to a restricted lane 1122 at a traffic control measure 1120 with a crosswalk 1124 at the inlet, preceding the intersecting roadway (e.g., road 1113). FIG. 12 illustrates an example diagram 1200 of a vehicle 150 at the intersection 1110 of FIG. 11 with an overlaid inferred stop line 1231 prior to the crosswalk 1124. For illustrative purposes, the intersection 1110 includes a first road (e.g., road 1111) intersecting with a second road (e.g., road 1113). In the illustration, lane 1121 is a neighboring lane relative to the restricted lane 1122. Lane segment 1125 is determined to be a nearest lane conflict. The line segment 1230 is shown as initialized at the unpainted stop line or entry line 1130 of the traffic control measure 1120. In FIG. 12, the vehicle 150 is advanced to the inferred stop line 1231 with an area denoted as a second target distance 1235. The trajectory is configured to stop the vehicle 150 so that the vehicle does not cross the inferred stop line 1231. The inferred stop line is equidistant from and at the target distance from a nearest boundary of the crosswalk 1124.

Figure 13:
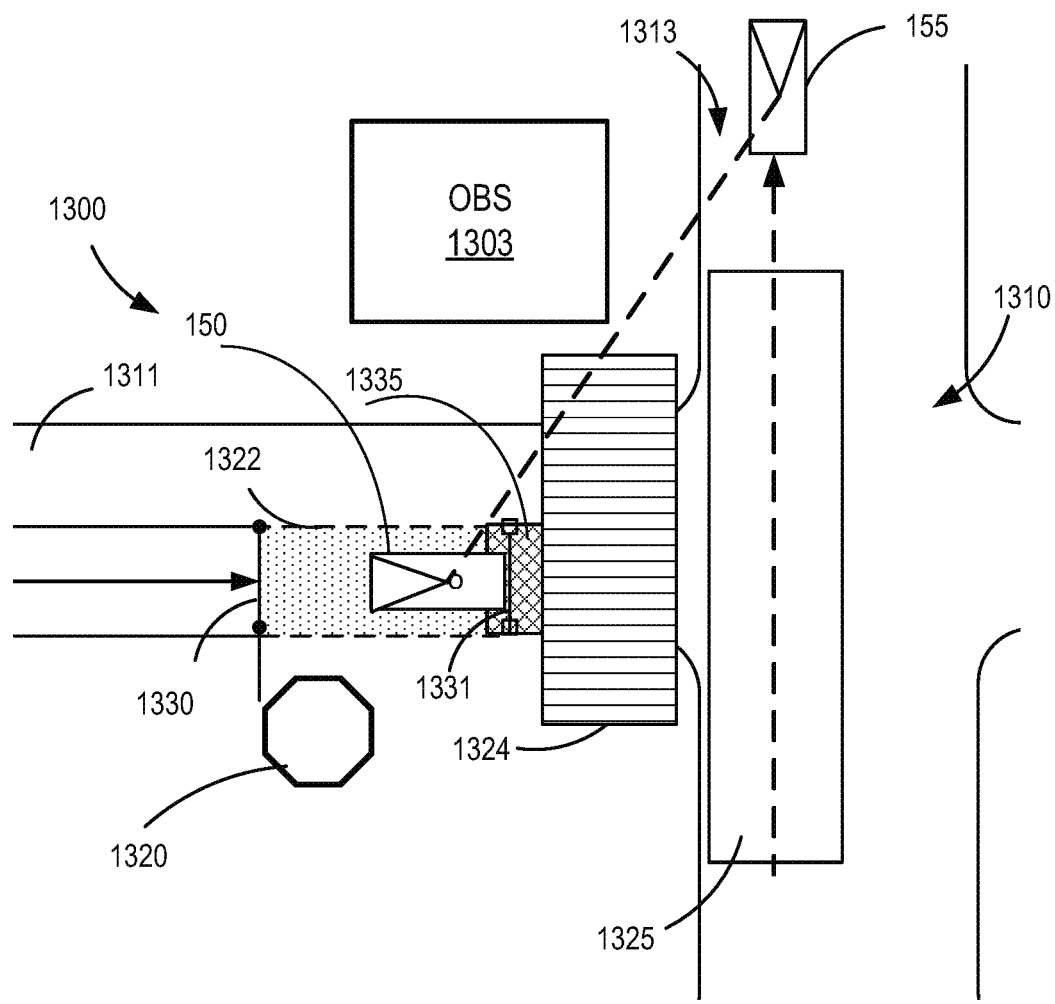
FIG. 13 illustrates an example diagram of a vehicle at the intersection of with an inferred stop line based on unblocked visibility.

FIG. 13 illustrates an example diagram 1300 of a vehicle 150 at an intersection with an inferred stop line 1331 based on unblocked visibility of a portion of the intersecting road 1313. Assume, that the intersection 1310 is similar to intersection 1110 of FIG. 12 but it includes an obstruction 1303 in proximity to the traffic control measure 1320. In this example, if the line segment 1330 is advanced from the traffic control measure 1320 and stops at the inferred stop line 1231 (FIG. 12), the line-of-sight of intersecting road 1313 from the perspective of vehicle 150 would be occluded by an obstruction 1303. This would be determined at 860 of FIG. 8B. Likewise, a driver's view of vehicle 150 from the perspective of vehicle 155 in the intersecting road 1313 could be occluded by the obstruction 1303. The high-definition map data may identify a geographic location of the obstruction 1303 relative to at least one of road 1311 or the restricted lane 1322 and intersecting road 1313. The inferred stop line 1331 as compared to inferred stop line 1231 is moved closer to the inlet of the crosswalk. This is accomplished at 864, 866 and back to 856 of FIG. 8B. The inferred stop line 1331 may sometimes be referred to as a "refined inferred stop line." This provides unblocked visibility of the intersecting road 1313 and vehicle 155. For example, the computer vision system may capture perception data to detect if its line-of-sight of the intersecting road is unblocked. The need to refine the location of the inferred stop line may occur due to obstructions, which are identified through perception data. For example, in some instances, an obstruction may be a truck which blocks a portion of the intersection such that visibility of the intersecting road 1313 is temporarily blocked.

Figure 14A:
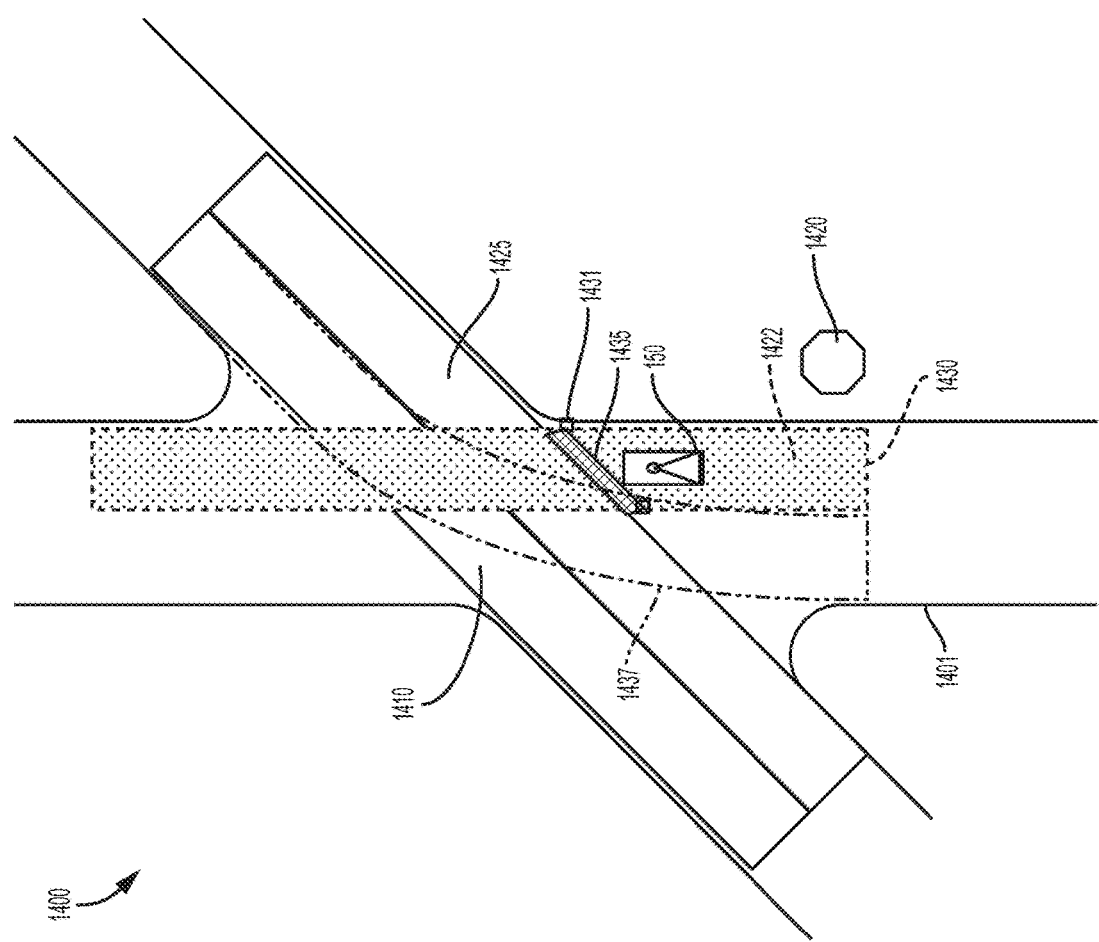
FIG. 14A illustrates an example diagram of a vehicle at a non-orthogonal intersection with example lane conflict candidates.

FIG. 14A illustrates an example diagram 1400A of a vehicle 150 at a non-orthogonal intersection 1410 with example lane conflict candidates 1425 and 1437. The non-orthogonal intersection 1410 has at least one traffic control measure 1420 with the line segment 1430 for the entry line shown. The lane conflict candidate 1437 is represented as dash, dot, dot lines and crosses over and neighbors the restricted lane 1422 at the inlet. In this example, the conflict candidate 1425 is selected for use in inferring the stop location. Even though the conflict 1437 is nearer than conflict 1425 from the perspective of the vehicle 150, it is not selected due to the exclusion of lane segments that neighbor the restricted lane at the inlet (808 in FIG. 8A). A stop line inferred based on conflict 1437 would be undesirably far back from the intersecting road, because the conflict 1437 overlaps the restricted lane 1420 all the way back to the entry line 1430 at the traffic control measure 1420.

Figure 14B:
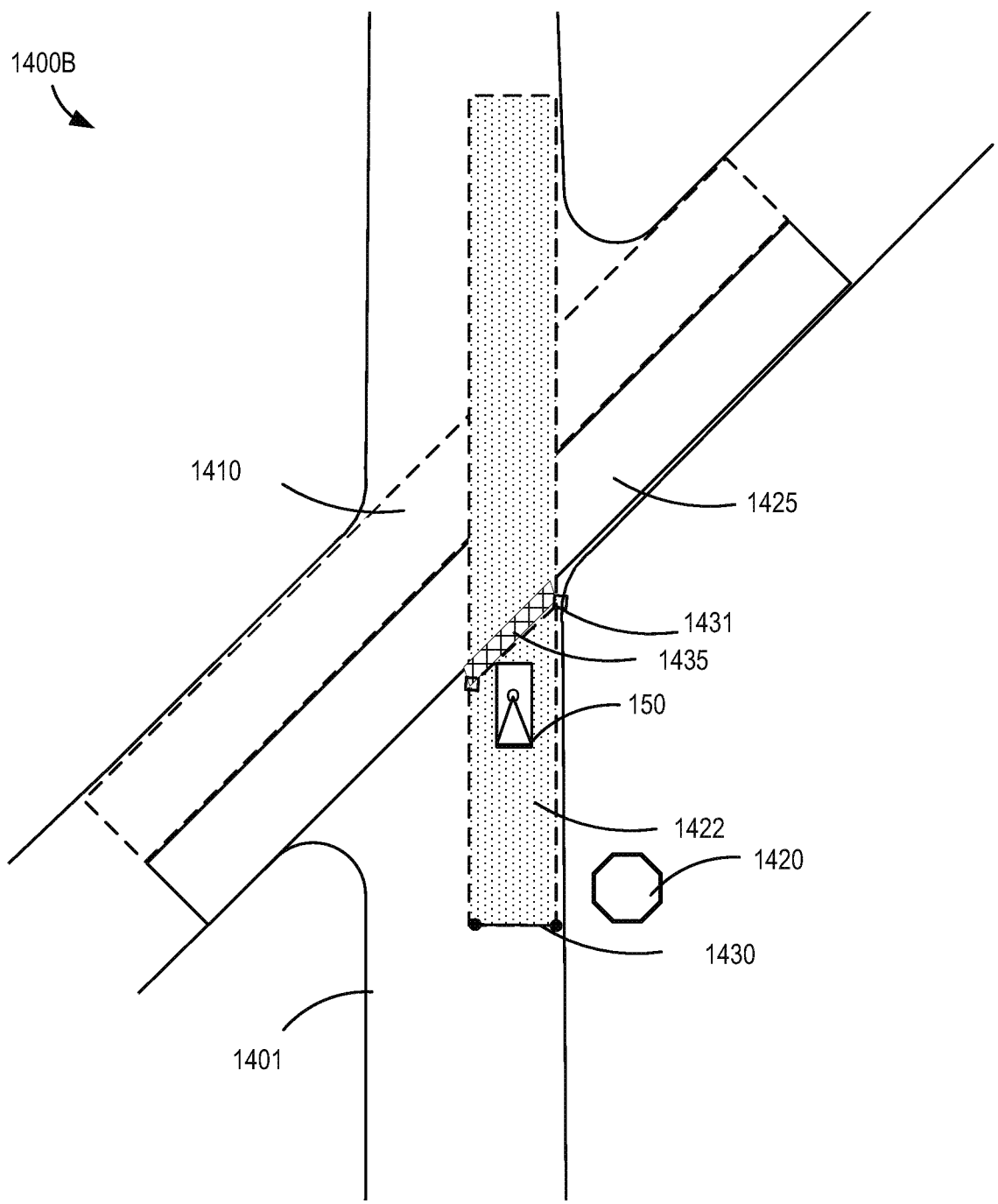
FIG. 14B illustrates an example diagram of a vehicle at a non-orthogonal intersection with an inferred stop line prior to the nearest lane conflict.

Referring also to FIG. 14B, an example diagram 1400B of a vehicle 150 at the non-orthogonal intersection 1410 with the inferred stop line 1431 relative to the nearest lane conflict 1425 shown. Road 1401 may be augmented with an inferred stop line 1431 prior to the nearest lane conflict 1425. Both the left and right endpoints of the inferred stop line 1431 are the same target distance from the lane conflict 1425. For example, if the target distance value was 1 m, both the left and right endpoints of the inferred stop line 1431 would be 1 m from the lane conflict 1425. As a result, the inferred stop line 1431 is angled to be substantially parallel to the leading edge of the nearest lane conflict 1425.

FIG. 15 illustrates an example diagram 1500 of a vehicle 150 at a non-orthogonal intersection 1510 controlled by at least one traffic control measure 1520. The line segment 1530 is shown at the entry line to the restricted lane 1522. Road 1501 will be augmented with an inferred stop line 1531 prior to the crosswalk 1524 by a target distance 1535. Both the left and right endpoints of the inferred stop line 1531 are the same target distance from the crosswalk 1524. As a result, the inferred stop line 1531 is angled to be substantially parallel to the leading edge of the crosswalk 1524.

FIG. 16 illustrates an example architecture of a system 1600 with an on-board computing device 1610 for an autonomous vehicle 150. The system 1600 may perform machine learning employing feature extraction algorithms for detecting the objects and the speed of the object or obstructions in real-time captured images. The feature extraction algorithms may include, without limitation, edge detection, corner detection, template matching, dynamic texture processing, segmentation image processing, motion detection, object tracking, background subtraction, object recognition and classification, etc. The computer vision system of vehicle 150 processes captured images and detects objects, object's speed, etc. using machine learning algorithms.

With specific reference to FIG. 16, the system 1600 may include an engine or motor 1602 and various sensors 1635 for measuring various parameters of the vehicle 150 and/or its environment. The system 1600 may be integrated into a vehicle body. The vehicle 150 may be fully automated or semi-automated. Operational parameter sensors 1635 that are common to both types of vehicles include, for example: a position sensor 1636 such as an accelerometer, gyroscope and/or inertial measurement unit; a speed sensor 1638; and an odometer sensor 1640. The system 1600 also may have a clock 1642 that the system architecture uses to determine vehicle time during operation. The clock 1642 may be encoded into the on-board computing device 1610, it may be a separate device, or multiple clocks may be available.

The system 1600 also may include various sensors that operate to gather data about the environment in which the vehicle is traveling. These sensors may include, for example: a location sensor 1660 such as a global positioning system (GPS) device; object detection sensors such as one or more cameras 1662, a laser detection and ranging (LADAR) system and/or light detecting and ranging (LIDAR) system 1664, radio detection and ranging (RADAR) system and/or a sound navigation and ranging (SONAR) system 1666. The object detection sensors may be part of a computer vision system of the vehicle. The sensors 1635 also may include environmental sensors 1668 such as a precipitation sensor and/or ambient temperature sensor. The object detection sensors may enable the system 1600 to detect objects that are within a given distance or range of the vehicle 150 in any direction, while the environmental sensors collect data about environmental conditions within the vehicle's area of travel. The system 1600 will also include one or more cameras 1662 for capturing images of the environment, such as images of traffic control measures as described above.

During operations, the sensors communicate information to an on-board computing device 1610. The on-board computing device 1610 analyzes the data captured by the sensors and optionally controls operations of the vehicle based on results of the analysis. For example, the on-board computing device 1610 may control: braking via a brake controller 1623; direction and steering via a steering controller 1624; speed and acceleration via a throttle controller 1626 (in a gas-powered vehicle) or a motor speed controller 1628 (such as a current level controller in an electric vehicle); a transmission via a differential gear controller 1630 (in vehicles with a transmissions); and/or other controllers such as an auxiliary device controller 1654. The on-board computing device 1610 may include one or more communication links to the sensors 1635.

The system 1600 also may include a transceiver 1690 that is capable of receiving signals via external systems, such as V2X communications from external traffic control measures, other vehicles, or other objects.

The on-board computing device 1610 may be implemented using hardware, firmware, software or a combination of any of these. For instance, the on-board computing device 1610 may be implemented as part of a microcontroller, processor, and/or graphics processing units (GPUs). The on-board computing device 1610 may include or interface with a register, data store and/or memory 1670 for storing data and programming instructions, which when executed, performs vehicle navigation based on sensor information, such as from cameras and sensors of a computer vision system.

The on-board computing device 1610 may include ROI generator 1612 for performing the functions at 102 (FIG. 1). The ROI generator 1612 may be implemented using hardware, firmware, software or a combination of any of these. For instance, ROI generator 1612 may be implemented as part of a microcontroller, processor, and/or graphics processing units (GPUs). The ROI generator 1612 may include or interface with a register, data store or memory 1670 for storing data and programming instructions, which when executed, generates a geographic area (i.e., geographic area 201) of a geometric shape with a particular radius. The vehicle 150 may be placed in any location of the area, such as at or near the center of the area. For example, the radius may be 50 feet to 100 feet. The radius may be in the range of 10-300 feet. As the vehicle is driven, the ROI generator 1612 may update the geographic area on a high-definition map.

The on-board computing device 1610 may include a map selector 1614 for performing the functions at 104 and/or 106 (FIG. 1). The map selector 1614 may be implemented using hardware, firmware, software or a combination of any of these. For instance, map selector 1614 may be implemented as part of a microcontroller, processor, and/or graphics processing units (GPUs). The map selector 1614 may include or interface with a register, data store or memory 1670 for storing data and programming instructions, which when executed, looks up a portion of the map that corresponds to the geographic area of the retrieve high-definition map data, and/or extract the lane segment data of the lane segments.

The on-board computing device 1610 may include a motion monitor 1616 for performing the functions at 108 and/or 110 (FIG. 1). The motion monitor 1616 may be implemented using hardware, firmware, software or a combination of any of these. For instance, motion monitor 1616 may be implemented as part of a microcontroller, processor, and/or graphics processing units (GPUs). The motion monitor 1616 may include or interface with a register, data store or memory 1670 for storing data and programming instructions, which when executed, determines a direction of travel of the vehicle 150 using sensed data from sensors 1635 and/or monitors the motion of the vehicle 150 based on the lane segment data. The speed of the vehicle may be monitored, as well.

Geographic location information may be communicated from the location sensor 1660 to the on-board computing device 1610, which may then access a map of the environment that corresponds to the location information to determine known fixed features of the environment such as streets, buildings, stop signs and/or stop/go signals. The map includes high-definition map data 1671. In addition or alternatively, the vehicle 150 may transmit any of the data to a remote server system (i.e., remote server 260 of FIG. 2) for processing. Any known or to be known technique for making an object detection based on sensor data and/or captured images can be used in the embodiments disclosed in this document.

To determine a heading (i.e., sensed direction of travel) of the vehicle, the on-board computing device 1610 may determine the location, orientation, pose, etc. of the vehicle in the environment (localization) based on, for example, three dimensional position data (e.g., data from a GPS), three dimensional orientation data, predicted locations, or the like. For example, the on-board computing device 1610 may receive GPS data to determine the vehicle's latitude, longitude and/or altitude position. Other location sensors or systems such as laser-based localization systems, inertial-aided GPS, or camera-based localization may also be used to identify the location of the vehicle. The location of the vehicle 150 may include an absolute geographical location, such as latitude, longitude, and altitude as well as relative location information, such as location relative to other cars immediately around it, which can often be determined with less noise than absolute geographical location. The map data 1671 can provide information regarding the identity and location of different roadways, lane segments, buildings, or other items, the location, boundaries, and directions of traffic lanes (e.g., the location and direction of a parking lane, a turning lane, a bicycle lane, or other lanes within a particular roadway) and metadata associated with traffic lanes, traffic control data (e.g., the location and instructions of signage, traffic lights, or other traffic control measures); and/or any other map data 1671 that provides information that assists the on-board computing device 1610 in analyzing the surrounding environment of the vehicle 150. The map data 1671 may also include information and/or rules for determining right of way of objects and/or vehicles in conflicted areas or spaces.

The on-board computing device 1610 may include a traffic control measure detector 1618 for performing the function at 112 (FIG. 1). The traffic control measure detector 1618 may be implemented using hardware, firmware, software or a combination of any of these. For instance, traffic control measure detector 1618 may be implemented as part of a microcontroller, processor, and/or graphics processing units (GPUs). The traffic control measure detector 1618 may include or interface with a register, data store or memory 1670 for storing data and programming instructions, which when executed, detects whether a traffic control measure is in the path. The traffic control measure detector 1618 may include or interface with a register, data store or memory 1670 for storing data and programming instructions, which when executed, assesses the high-definition map data for information such as one or more of a restricted lane, the entry line of the restricted lane, the restricted lane length, the heading, the type of traffic control measure, or type of intersection, for example.

The on-board computing device 1610 may include a stop line detector 1620 for performing the functions at 114, 115 and 116 (FIG. 1). The stop line detector 1620 may be implemented using hardware, firmware, software or a combination of any of these. For instance, stop line detector 1620 may be implemented as part of a microcontroller, processor, and/or graphics processing units (GPUs). The stop line detector 1620 may include or interface with a register, data store or memory 1670 for storing data and programming instructions, which when executed, detects a stop line for a particular traffic control measure configuration. For example, the stop line may be painted, in some scenarios. The computer vision system may detect a painted stop line using machine learning or the system 1600 may search for information related to the painted stop line in the high-definition map data 1671. The programming instructions, which when executed, may cause a processor, microprocessor or GPU to detect the entry line of a restricted lane and set the entry line to equal the stop line for those intersections with no nearest lane conflict. The programming instructions, which when executed, may cause a processor, microprocessor or GPU to receive a first (off-board) inferred stop line and then refine the inferred stop line on-board the vehicle based on an unblocked visibility criteria. The programming instructions, which when executed, may cause a processor, microprocessor or GPU to determine an inferred stop line for angled boundaries of lane conflicts or crosswalks relative to a restricted lane, such as found at a non-orthogonal intersection.

The on-board computing device 1610 may include a trajectory generator 1622 for performing the functions at 118 (FIG. 1). The on-board computing device 1610 may perform machine learning for planning the trajectory of the vehicle along a route from an origination location to a destination location of global coordinate system. The parameters may include, without limitation, motor vehicle operation laws of a jurisdiction (i.e., speed limits), objects in a path of the vehicle, scheduled or planned route, traffic lights of intersections, and/or the like.

The on-board computing device 1610 may include a motion controller 1650 for performing the function at 120 (FIG. 1). The on-board computing device 1610 may, based on the planned trajectory, control the motion of the vehicle, including to travel through an intersection based on a painted stop line, an unpainted stop line or an inferred stop line.

In certain embodiments, the map data 1671 may also include information about a planned (reference) path 1674 that corresponds to common patterns of vehicle travel along one or more lanes such that the motion of the object is constrained to the planned (reference) path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like). The planned path 1674 may include data associated with an inferred stop line 1676, as determined in FIGS. 7 and 8A-8B. The vehicle navigates to the inferred stop line and stops before proceeding through the intersection. The planned path 1674 may include information, such as images, location data and/or coordinates, associated with a painted stop line 1678, at which the vehicle could be stopped. The planned path 1674 may include information, such as images, location data, and/or coordinates, associated with a crosswalk 1680, if present. The vehicle's size relative to the vehicle location, denoted by the circle at the apex of the triangle, is used to interpolate the location of the front end of the vehicle to generate the control signals at 120 (FIG. 1).

The planned path 1674 controls the navigation of the vehicle 150 along a trajectory in the vehicle's travel lane and through an intersection.

In various implementations, an on-board computing device 1610 may determine perception information of the surrounding environment of the vehicle 150. Based on the sensor data provided by one or more sensors and obtained location information, the on-board computing device 1610 may determine perception information of the surrounding environment of the vehicle 150. The perception or computer vision information may represent what an ordinary driver would perceive in the surrounding environment of a vehicle. The perception or computer vision data may include information relating to one or more objects in the environment of the vehicle 150. For example, the on-board computing device 1610 may process perception data that includes sensor data (e.g., LADAR data, LIDAR data, RADAR data, SONAR data, camera images, etc.) in order to identify objects and/or features in the environment of vehicle 150. The objects may include traffic signals, roadway boundaries, other vehicles, pedestrians, and/or obstacles, etc. The on-board computing device 1610 may use any now or hereafter known object recognition algorithms, video tracking algorithms, and computer vision algorithms (e.g., track objects frame-to-frame iteratively over a number of time periods) to determine the perception. The perception information may include objects identified by ground LIDAR point.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, vehicles, aircraft, aerial drones and the like. An "autonomous vehicle" is a vehicle having a processor, programming instructions and drivetrain components that are controllable by the processor without requiring a human operator. An autonomous vehicle may be fully automated in that it does not require a human operator for most or all driving conditions and functions. Alternatively, it may be semi-autonomous in that a human operator may be required in certain conditions or for certain operations, or that a human operator may override the vehicle's automated system and may take control of the vehicle. The autonomous vehicles also include vehicles in which automated systems augment human operation of the vehicle, such as vehicles with driver-assisted steering, speed control, braking, parking and other advanced driver assistance systems.

An "electronic device" or a "computing device" refers to a device that includes a processor and memory. Each device may have its own processor and/or memory, or the processor and/or memory may be conflicted with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory computer-readable medium where programming instructions and data are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LADAR system data, LIDAR system data, and/or other data.

The term "object," when referring to an object that is detected by a computer vision system of the vehicle, is intended to encompass both stationary objects and moving (or potentially moving) actors or pedestrians, except where specifically stated otherwise by terms use of the term "actor" or "stationary object."

In this document, when relative terms of order such as "first" and "second" are used to modify a noun, such use is simply intended to distinguish one item from another, and is not intended to require a sequential order unless specifically stated.

In addition, terms of relative position such as "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of inferring a stop line for a vehicle at an intersection, the method comprising:
   by a processor of a vehicle, while the vehicle is moving along a reference path on a first road in a geographic area:
   accessing map data for a map, the map data comprising data representing a plurality of roads in the geographic area, wherein the map data segments each of the roads into lane segments;
   detecting from the accessed map data that a traffic control measure is located proximate an intersection that is ahead of the vehicle along the reference path;
   performing first operations to detect a stop line for the detected traffic control measure that is painted on the first road before or at the intersection;
   in response to no stop line for the detected traffic control measure being detected, performing the following second operations to obtain an inferred location of the stop line:
   identifying, as a restricted lane, a lane segment of the first road that (i) includes an entry line proximate a location of the traffic control measure and (ii)

extends into the intersection, wherein the entry line at least partially defines a boundary of the restricted lane;

identifying, as a nearest lane conflict, a lane segment of a second road intersecting the restricted lane;

determining whether the entry line of the restricted lane is within a target distance of the lane segment of the second road intersecting the restricted lane;

setting the inferred location of the stop line to a location of the entry line responsive to a determination being made that the entry line is within the target distance of the lane segment of the second road; and performing the following third operations responsive to a determination being made that the entry line is not within the target distance from the lane segment of the second road:

initializing a location of an inferred stop line as the location of the entry line of the restricted lane;

advancing the location of the inferred stop line a distance away from the vehicle and towards the nearest lane conflict;

iteratively repeating the advancing until the location of the inferred stop line is at the target distance from a nearest boundary of the nearest lane conflict;

setting a final location of the inferred stop line as the location of the inferred stop line at completion of said iteratively repeating;

refining the final location of the inferred stop line based on at least one object perceived in an environment using sensor data, wherein the at least one object excludes any traffic control measure; and setting the inferred location of the stop line as the refined final location of the inferred stop line.

2. The method of claim 1, further comprising, by the processor of the vehicle, causing the vehicle to decelerate and stop at a location in the restricted lane at or before the inferred location of the stop line.

3. The method of claim 1, wherein the third operations further comprise:

constructing a line segment as an intermediate stop line between a first set of points alongside boundaries of the restricted lane; and iteratively advancing opposite endpoints of the line segment along the side boundaries until each endpoint is at the target distance from the nearest boundary of the nearest lane conflict, thus yielding the inferred location of the stop line.

4. The method of claim 3, wherein iteratively advancing opposite endpoints of the line segment comprises:

advancing the opposite endpoints independently until each of the opposite endpoints reaches the target distance from the nearest boundary of the nearest lane conflict; and forming the inferred stop line to intersect the restricted lane at the same angle as the nearest lane conflict.

5. The method of claim 1, further comprising, by the processor of the vehicle:

detecting that a crosswalk crosses the first road before the nearest lane conflict of the intersection, wherein the third operations further comprise constructing a line segment as an intermediate stop line across the restricted lane and iteratively advancing opposite endpoints of the line segment until each endpoint is a target distance from a nearest boundary of the crosswalk.

6. The method of claim 5, wherein iteratively advancing the opposite endpoints of the line segment comprises:

advancing the opposite endpoints independently until each of the opposite endpoints reaches the target distance from the nearest boundary of the crosswalk; and forming the inferred stop line to intersect the restricted lane at the same angle as the nearest boundary of the crosswalk.

7. The method of claim 1, further comprising, by the processor of the vehicle:

in response to determining that no lane conflict is identified as appropriate to infer a stop line, setting the entry line as the stop line; and causing the vehicle to stop at the entry line of the restricted lane.

8. The method of claim 1, further comprising, by the processor of the vehicle:

determining whether a line-of-sight of a vision system of the vehicle to an intersecting road of the intersection is blocked; and refining the target distance, in response to the line-of-sight being blocked, wherein said third operations include:

advancing the location of the entry line until the refined target distance from the nearest boundary of the nearest lane conflict is reached to form the inferred stop line.

9. The method of claim 8, further comprising, by the processor of the vehicle, repeating:

determining whether the line-of-sight of the vision system of the vehicle remains blocked;

refining the target distance, in response to the line-of-sight remaining blocked, and advancing the entry line until the refined target distance from the nearest boundary of the nearest lane conflict is reached, wherein the repeating continues until a first one of the line-of-sight is unblocked or the nearest boundary of the nearest lane conflict is reached.

10. The method of claim 1, wherein identifying the nearest lane conflict comprises:

identifying a plurality of candidate lane segments into which the vehicle may enter when moving along the reference path to traverse the second road;

evaluating the plurality of candidate lane segments to determine which are appropriate nearest lane conflicts by:

removing, from the candidate lane segments, any lane segment that merges with an outlet of the restricted lane, and removing, from the candidate lane segments, any lane segment that neighbors an inlet of the restricted lane;

selecting, from the appropriate nearest lane conflicts, the nearest lane segment into which the vehicle will enter when moving along the reference path to traverse the second road, as the nearest lane conflict.

11. A system for inferring a stop line for a vehicle at an intersection, the system comprising:

sensors configured to capture data about an environment that is proximate the vehicle;

a processor; and a non-transitory computer readable medium comprising programming instructions that, when executed by the processor, will cause the processor to, while the vehicle is moving along a reference path on a first road in a geographic area:

access map data for a map, the map data comprising data representing a plurality of roads in the geographic area, wherein the map data segments each of the roads into lane segments;

detect from the accessed map data that a traffic control measure is positioned before an intersection that is ahead of the vehicle in the reference path;

perform first operations to detect a stop line for the detected traffic control measure that is painted on the first road before or at the intersection;

in response to no stop line being detected, perform the following second operations to obtain an inferred location of the stop line:

identifying, as a restricted lane, a lane segment of the first road that (i) includes an entry line proximate a location of the traffic control measure and (ii) extends into the intersection, wherein the entry line at least partially defines a boundary of the restricted lane;

identifying, as a nearest lane conflict, a lane segment of a second road intersecting the first road at the intersection;

determining whether the entry line of the restricted lane is within a target distance of the lane segment of the second road intersecting the restricted lane;

setting the inferred location of the stop line to a location of the entry line responsive to a determination being made that the entry line is within the target distance of the lane segment of the second road; and performing the following third operations responsive to a determination being made that the entry line is not within the target distance from the lane segment of the second road:

initializing a location of an inferred stop line as the location of the entry line of the restricted lane;

advancing the location of the inferred stop line a distance away from the vehicle and towards the nearest lane conflict;

iteratively repeating the advancing until the location of the inferred stop line is at the target distance from a nearest boundary of the nearest lane conflict;

setting a final location of the inferred stop line as the location of the inferred stop line at completion of said iteratively repeating;

refining the final location of the inferred stop line based on at least one object perceived in an environment using sensor data, wherein the at least one object excludes any traffic control measure; and setting the inferred location of the stop line as the refined final location of the inferred stop line.

12. The system of claim 11, further comprising programming instructions that will cause the processor to cause the vehicle to decelerate and stop at a location in the restricted lane at or before the inferred location of the stop line.

13. The system of claim 11, wherein the third operations further comprise:

constructing a line segment as an intermediate stop line between a first set of points alongside boundaries of the restricted lane; and iteratively advance opposite endpoints of the line segment along the side boundaries until the endpoints are equidistant from the target distance from the nearest boundary of the nearest lane conflict, thus yielding the inferred location of the stop line.

14. The system of claim 13, further comprising programming instructions that will cause the processor to, when iteratively advancing the opposite endpoints of the line segment:

advance the opposite endpoints independently until each of the opposite endpoints reaches the target distance from the nearest boundary of the nearest lane conflict, forming the inferred stop line to intersect the restricted lane at the same angle as the boundary of the nearest lane conflict.

15. The system of claim 11, further comprising programming instructions that will cause the processor to:

detect that a crosswalk crosses the first road before the nearest lane conflict of the intersection, construct a line segment as an intermediate stop line across the restricted lane; and iteratively advance opposite endpoints of the line segment to a location that is equidistant from and at a target distance from a nearest boundary of the crosswalk.

16. The system of claim 15, wherein the programming instructions that will cause the processor to iteratively advance the opposite endpoints of the line segment further comprise programming instructions that will cause the processor to:

advancing the opposite endpoints of the line segment independently until each of the opposite endpoints reaches the target distance from the nearest boundary of the crosswalk; and forming the inferred stop line to intersect the restricted lane at the same angle as the nearest boundary of the crosswalk.

17. The system of claim 11, further comprising programming instructions that will cause the processor to:

in response to determining that no nearest lane conflict is identified as appropriate to infer a stop line, set the entry line as the stop line; and cause the vehicle to stop at the entry line of the restricted lane.

18. The system of claim 11, further comprising programming instructions that will cause the processor to:

determine a line-of-sight of a vision system of the vehicle to an intersecting road of the intersection is blocked; and refine the target distance, in response to the line-of-sight being blocked, advance the location of the entry line until the refined target distance from the nearest boundary of the nearest lane conflict is reached to form the inferred stop line.

19. The system of claim 18, further comprising programming instructions that will cause the processor to:

determine whether the line-of-sight of the vision system of the vehicle remains blocked;

refine the target distance, in response to the line-of-sight remaining blocked; and advance the entry line until the refined target distance from the boundary of the nearest lane conflict is reached until the line-of-sight is unblocked.

20. The system of claim 11, wherein the programming instructions that will cause the processor to identify the nearest lane conflict further comprise programming instructions that will cause the processor to:

identify a plurality of candidate lane segments into which the vehicle may enter when moving along the reference path to traverse the second road;

evaluate the plurality of candidate lane segments to determine which are appropriate nearest lane conflicts by:

removing, from the candidate lane segments, any lane segment that merges with an outlet of the restricted lane, and removing, from the candidate lane segments, any lane segment that neighbors an inlet of the restricted lane; and select, from the appropriate nearest lane conflicts, the nearest lane segment into which the vehicle will enter when moving along the reference path to traverse the second road, as the nearest lane conflict.

21. A memory containing programming instructions for inferring a stop line for a vehicle at an intersection, the memory comprising:

a non-transitory computer-readable medium; and programming instructions stored on the computer-readable medium that, when executed by a processor, will cause the processor to, while the vehicle is moving along a reference path on a first road in a geographic area:

access map data comprising data representing a plurality of roads in the geographic area, wherein the map data segments each of the roads into lane segments;

detect from the accessed map data that a traffic control measure is positioned before an intersection that is ahead of the vehicle in the reference path;

determine whether a stop line for the detected traffic control measure is painted on the first road before or at the intersection;

in response to determining that no stop line is painted on the first road before or at the intersection, perform the following operations:

identifying, as a restricted lane, a lane segment of the first road that (i) includes an entry line proximate a location of the traffic control measure and (ii) extends into the intersection, wherein the entry line at least partially defines a boundary of the restricted lane;

identifying, as a nearest lane conflict, a lane segment of a second road intersecting the restricted lane;

determining whether the entry line of the restricted lane is within a target distance of the lane segment of the second road intersecting the restricted lane;

setting the inferred location of the stop line to a location of the entry line responsive to a determination being made that the entry line is within the target distance of the lane segment of the second road; and performing the following other operation responsive to a determination being made that the entry line is not within the target distance of the lane segment of the second road:

initializing a location of an inferred stop line as the location of the entry line of the restricted lane;

advancing the location of the inferred stop line a distance away from the vehicle and towards the nearest lane conflict;

iteratively repeating the advancing until the location of the inferred stop line is at the target distance from a nearest boundary of the nearest lane conflict;

setting a final location of the inferred stop line as the location of the inferred stop line at completion of said iteratively repeating;

refining the final location of the inferred stop line based on at least one object perceived in an environment using sensor data, wherein the at least one object excludes any traffic control measure; and setting the inferred location of the stop line as the refined final location of the inferred stop line.

\* \* \* \* \*